(12) United States Patent
Fukuda et al.

(10) Patent No.: US 7,106,357 B2
(45) Date of Patent: Sep. 12, 2006

(54) PORTABLE INFORMATION TERMINAL DEVICE HAVING CAMERA FEATURE

(75) Inventors: Hiroyuki Fukuda, Hachioji (JP); Akira Matsui, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 910 days.

(21) Appl. No.: 10/225,264

(22) Filed: Aug. 21, 2002

(65) Prior Publication Data

US 2003/0040346 A1 Feb. 27, 2003

(30) Foreign Application Priority Data

| Aug. 27, 2001 | (JP) | ............................. 2001-256543 |
| Aug. 27, 2001 | (JP) | ............................. 2001-256544 |
| Sep. 28, 2001 | (JP) | ............................. 2001-302656 |

(51) Int. Cl.
*H04N 7/14* (2006.01)
(52) U.S. Cl. ............... 348/14.02; 348/14.01; 455/575.1; 455/575.3; 455/575.4
(58) Field of Classification Search .. 348/14.01–14.08, 348/376, 333.06, 335, 333.08; 455/575.1, 455/550.1, 556.1, 575.3, 566
See application file for complete search history.

(56) References Cited

U.S. PATENT DOCUMENTS

| 5,210,398 A | 5/1993 | Metlitsky |
| 5,866,895 A | 2/1999 | Fukuda et al. |
| 5,896,403 A | 4/1999 | Nagasaki et al. |
| 5,943,448 A | 8/1999 | Tatsuta |
| 6,243,447 B1 | 6/2001 | Swartz et al. |
| 6,532,035 B1 * | 3/2003 | Saari et al. .............. 348/14.02 |

* cited by examiner

*Primary Examiner*—Melur Ramakrishnaiah
(74) *Attorney, Agent, or Firm*—Frishauf, Holtz, Goodman & Chick, P.C.

(57) ABSTRACT

A portable information terminal device having a camera feature and comprises a case provided with an image pickup module including a lens and an image pickup element and a lid member of the device provided at a predetermined position with an adapter optical system different from the lens. The lid member is linked to the case to be displaceable relative to the case between predetermined positions including a position for causing the optical axis of the lens and that of the adapter optical system to substantially agree with each other. When the optical axis of the lens and that of the adapter optical system are substantially agree with each other by displacing the case and the lid member relative to each other, the optical parameters of the synthetic optical system obtained by combining the lens and the adapter optical system are different from those of the lens.

45 Claims, 20 Drawing Sheets

Object point : 200mm
fl=4.74mm
ω=38.9°
Total length=8.7mm
(aperture – focal plane)

Object point : 20mm
fl=8.44mm
ω=15.2°
Total length=19.5mm
(first plane – focal plane)

Object point : ∞
fl=7.72mm
ω=25.4°
Total length=12mm
(aperture – focal plane)

Object point : 200mm
fl=4.74mm
ω=38.9°
Total length=18.6mm
(first plane – focal plane)

Object point : ∞
fl=10.43mm
ω=17.6°
Total length=19.4mm
(first plane – focal plane)

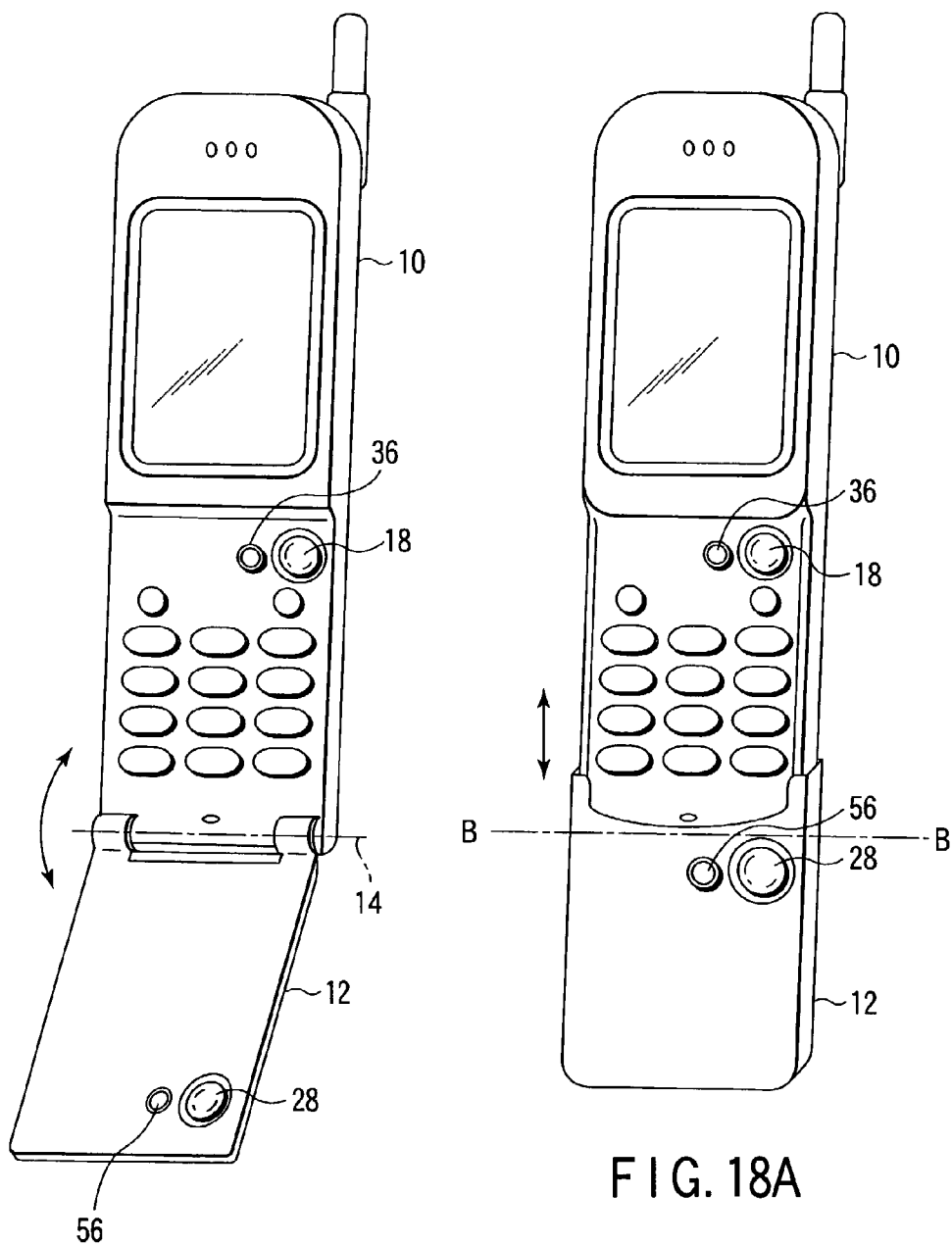
FIG. 17
FIG. 18A
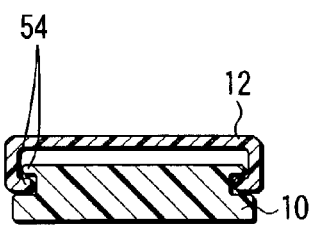
FIG. 18B

Object point : ∞
fl=7.72mm
ω=25.4°
Total length=12mm
(aperture - focal plane)

Object point : ∞
fl=10.43mm
ω=17.6°
Total length=19.4mm
(first plane - focal plane)

Object point : 200mm
fl=5.7mm
ω=34.0°
Total length=20.3mm
(first plane - focal plane)

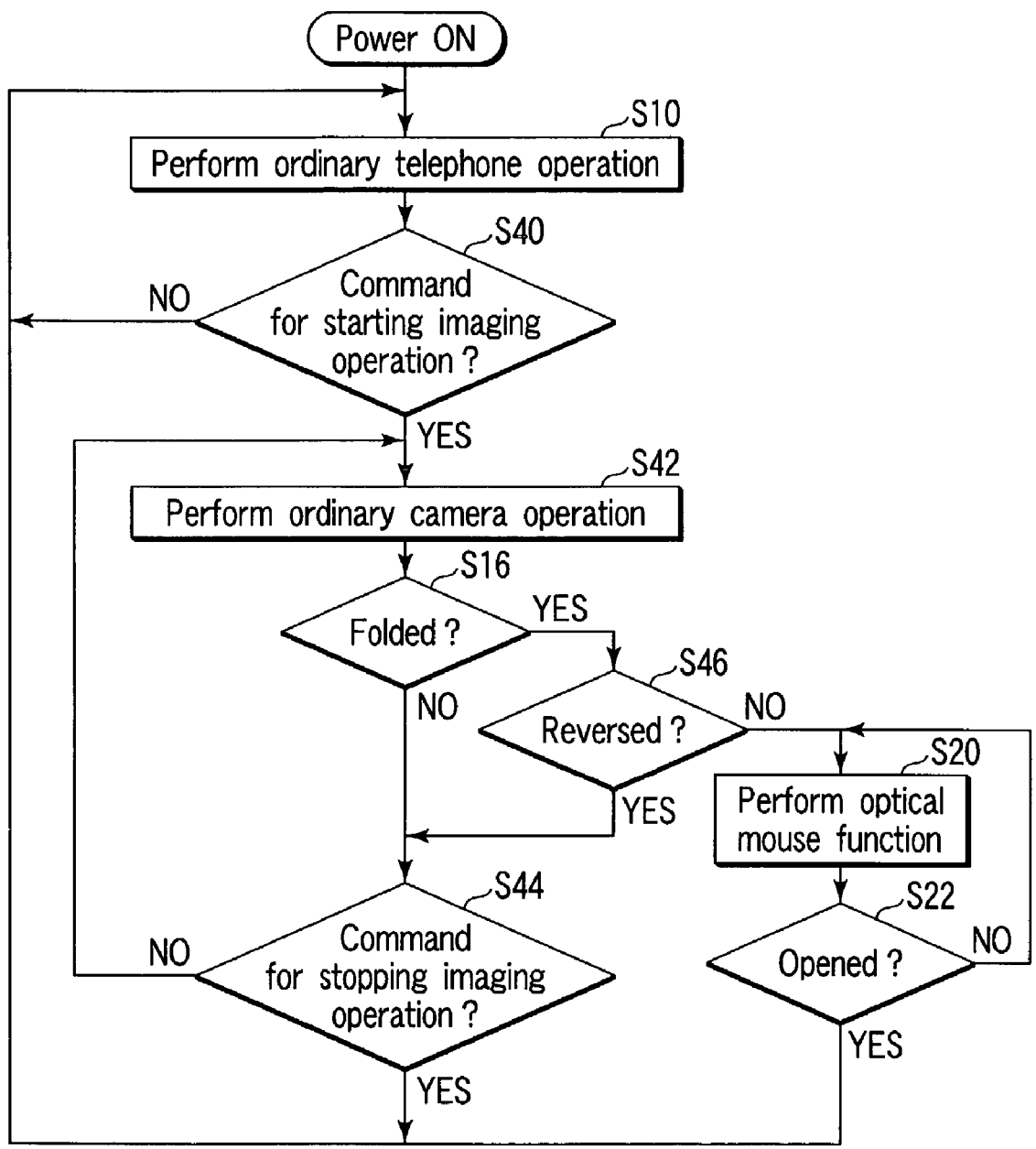
F I G. 27

PORTABLE INFORMATION TERMINAL DEVICE HAVING CAMERA FEATURE

CROSS-REFERENCE TO RELATED APPLICATIONS

This application is based upon and claims the benefit of priority from the prior Japanese Patent Applications No. 2001-256543, filed Aug. 27, 2001; No. 2001-256544, filed Aug. 27, 2001; and No. 2001-302656, filed Sep. 28, 2001, the entire contents of all of which are incorporated herein by reference.

BACKGROUND OF THE INVENTION

1. Field of the Invention

This invention relates to a portable information terminal device such as cellular phone or PDA (personal digital assistant). More particularly, the present invention relates to a portable information terminal device having a camera feature.

2. Description of the Related Art

In recent years, portable information terminal devices such as cellular phones and PDAs that are provided with a built-in camera feature have been developed due to the availability of small and low power consumption image pickup devices, electronic devices having improved processing capabilities, large capacity memories and high speed and large capacity (broad band) communication lines. Such a built-in camera feature is normally realized by using a CMOS (complementary metal-oxide semiconductor) image sensor.

Since such a portable information terminal device can be put into a bag or a pocket and carried by the user, it may be provided with a flipper for preventing it from being unintentionally operated if the operation keys are accidentally turned or depressed. The flipper is closed to cover the operation keys when the device is stored or carried so that the keys cannot be turned or depressed by mistake. There are also many portable information terminal devices of the type that come in two parts. The two parts of such a terminal device are linked to each other by a hinge and adapted to be folded together. An LCD (liquid crystal display) is arranged on one of them, while operation keys are arranged on the other. Foldable devices are advantageous in that they are compact when folded, which reliably prevents operation errors, and the liquid crystal screen is relatively large and protected against damage.

Additionally, in recent years, many sophisticated multi-functional cellular phones can be utilized not only for telephone communications but also for viewing electronic mail (E-mail) and accessing Internet contents. The foldable type is advantageous for such cellular phones because they can be equipped with a large LCD that can display a large amount of information at one time. Therefore, the demand for foldable cellular phones is increasing.

Now, an increasing number of cellular phones are provided with a built-in small image pickup module and hence a camera feature.

Meanwhile, portable and foldable information terminal devices such as PDAs and hand-held PCs (personal computers) are becoming popular because they can be conveniently stored when they are carried by users and the liquid display screen is protected. Again, an LCD is arranged on one of the two parts, while operation keys are arranged on the other. An increasing number of such information terminal devices are also provided with a built-in small image pickup module and hence a camera feature.

Thus, there are a large number of portable information terminal devices that are flippable or foldable and are also provided with a built-in image pickup module.

On the other hand, the image pickup modules built-in to such portable information terminal devices are required to be compact and lightweight and hence are not provided with a zooming mechanism, unlike ordinary cameras. In other words, a single focal point lens is used. Therefore, the magnification, the view angle and other parameters of the lens are fixed to values that are suitable for snap shots and not adjustable because the built-in cameras of portable information terminal devices are believed to be normally used for snap shots. In short, the built-in cameras of portable devices provide only a limited use of obtaining snap shots (without zooming).

It may be possible to change the view angle by so-called digital zooming of partly enlarging the electrically picked up image and taking out the enlarged part. However, since the built-in camera of a small portable device needs to meet the requirements of compactness, lightweight and low power consumption, the number of pixels of the image pickup device cannot be so large. Thus, digital zooming can give rise to a problem of remarkably degrading the image quality.

BRIEF SUMMARY OF THE INVENTION

In view of the above identified circumstances, it is therefore the object of the present invention to provide a portable information terminal device having a camera feature whose optical parameters can be modified with ease.

According to a first aspect of the present invention, there is provided a portable information terminal device having a camera feature and comprising:

a case provided with a first optical system and an image pickup element which receives light from an object point focused by the first optical system and outputs a corresponding image signal; and a lid member of the device provided at a predetermined position with a second optical system different from the first optical system, wherein the lid member is linked to the case so as to make itself displaceable relative to the case between predetermined positions including a position for causing an optical axis of the first optical system and that of the second optical system to substantially agree with each other; and optical parameters of a synthetic optical system obtained by combining the first optical system and the second optical system at a position for causing the optical axis of the first optical system and that of the second optical system to substantially agree with each other as reached by displacing the case and the lid member relative to each other is different from those of the first optical system.

According to a second aspect of the present invention, there is provided a portable information terminal device having a camera feature and comprising:

a case provided with a first optical system and an image pickup element which receives light from an object point located at a far point of a field of view and focused by the first optical system and outputs a corresponding image signal; and a lid member of the device provided at a predetermined position with a second optical system different from the first optical system, wherein the lid member is linked to the case so as to be displaceable relative to the case between predetermined positions including a position for causing an optical axis of the first optical system and that of the second optical system to substantially agree with each other;

optical parameters of a synthetic optical system obtained by combining the first optical system and the second optical system at a position for causing the optical axis of the first optical system and that of the second optical system to substantially agree with each other as reached by displacing the case and the lid member relative to each other is suited for focusing light from an object point at a near point in the field of view; and a lighting section which illuminates the object point at the near point is provided at the lid member.

According to a third aspect of the present invention, there is provided a portable information terminal device having a camera feature and comprising:

a case provided with a first optical system and an image pickup element which receives light from an object point focused by the first optical system and outputs a corresponding image signal; and a lid member of the device provided at a predetermined position with a second optical system different from the first optical system, wherein the lid member is linked to the case so as to make itself displaceable relative to the case and able to take a first state of an optical axis of the first optical system substantially agreeing with that of the second optical system and a second state of the second optical system of being reversed and of the optical axis of the first optical system substantially agreeing with that of the second optical system; and optical parameters of a synthetic optical system obtained by combining the first optical system and the second optical system in the first state of displacing the case and the lid member relative to each other, optical parameters of a synthetic optical system obtained by combing the first optical system and the second optical system in the second state of displacing the case and the lid member relative to each other and optical parameters of the first optical system are differentiated from each other.

According to a fourth aspect of the present invention, there is provided a portable information terminal device having a camera feature and comprising:

a case provided with a first optical system and an image pickup element which receives light from an object point focused by the first optical system and outputs a corresponding image signal; and a lid member of the device provided at predetermined respective positions with a second optical system different from the first optical system and a third optical system different from the first optical system and the second optical system, wherein the lid member are linked to the case so as to make itself displaceable relative to the case and able to take a first state of an optical axis of the first optical system substantially agreeing with that of the second optical system and a second state of the optical axis of the first optical system substantially agreeing with that of the third optical system; and optical parameters of a synthetic optical system obtained by combining the first optical system and the second optical system in the first state of displacing the case and the lid member relative to each other, optical parameters of a synthetic optical system obtained by combing the first optical system and the third optical system in the second state of displacing the case and the lid member relative to each other and optical parameters of the first optical system are differentiated from each other.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 17 is a schematic perspective view of the fourth embodiment of portable information terminal device of the present invention, which is a flipper type cellular phone;

FIGS. 18A and 18B are schematic perspective view and a cross sectional view of the fourth embodiment of portable information terminal device having a camera feature, which is a cellular phone having a sliding lid;

FIG. 27 is a flow chart of the operation of a cellular phone operating as optical mouse;

DETAILED DESCRIPTION OF THE INVENTION

Now, the present invention will be described by referring to the accompanying drawings that illustrate preferred embodiments of the invention.

1st EMBODIMENT

Figure 1A:
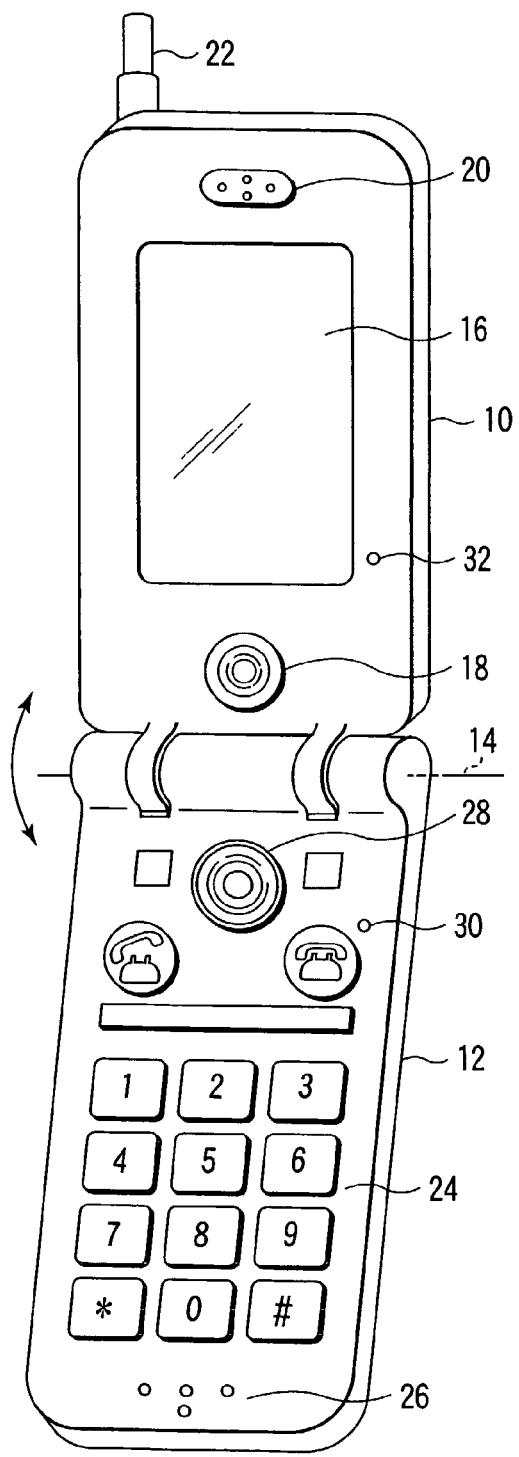
FIG. 1A is a schematic perspective view of the first embodiment of the invention, which is a foldable cellular phone as a portable information terminal device having a camera feature.

FIG. 1A is a schematic perspective view of the first embodiment of the invention, which is a foldable cellular phone as a portable information terminal device having a camera feature.

The cellular phone comprises a case 10 and a lid member 12 which is linked to the case 10 so as to be foldable in opposite directions indicated by a two-directional arrow in FIG. 1A. More specifically, the case 10 and the lid member 12 are linked to each other by way of a rotary shaft 14 in such a way that they can rotate (are displaceable) relative to each other.

Figure 1B:
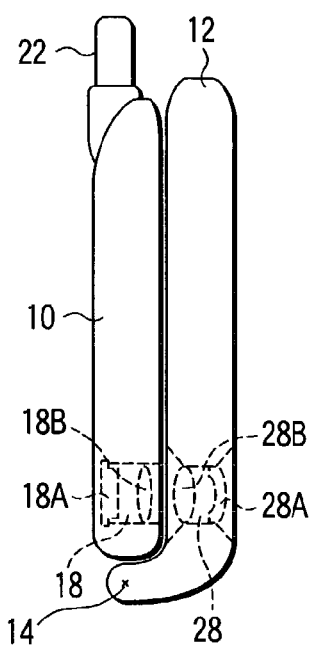
FIG. 1B is a schematic lateral view, illustrating the positional relationship between an image pickup module and an adapter optical system when the cellular phone is folded.

A display section 16, an image pickup module (camera) 18 and a loudspeaker 20 are arranged on the side of the case 10 that becomes the inner side of the cellular phone when it is folded. The display section 16 includes an LCD or EL (electro-luminescence) panel and is adapted to display user interface information such as telephone directory and operation menus. The image pickup module 18 comprises an image pickup element 18A such as a CMOS sensor or a CCD (charge-coupled device) and a lens (first optical system) 18B as shown in FIG. 1B. An antenna 22 is fitted to the case 10.

On the other hand, operation keys 24 and a microphone 26 are arranged on the side of the lid member 12 that becomes the inner side of the cellular phone when it is folded. Additionally, an adapter optical system 28 that is the second optical system is arranged on the lid member 12 of this embodiment. Note that the adapter optical system 28 is arranged substantially on the optical axis of the image pickup module 18 of the case 10 when the cellular phone is folded. The adapter optical system 28 comprises a plurality of lenses 28A, 28B as shown in FIG. 1B. Light can be transmitted to the rear surface of the lid member 12. In other words, light enters the image pickup module 18 on the case 10 through the rear surface of the lid member 12.

The lid member 12 is provided with a closure detection switch 30, while the case 10 is provided with a closure detection switch depressing projection 32 at a position corresponding to the closure detection switch 30 of the case 10. As the cellular phone is folded and closed completely, the closure detection switch depressing projection 32 depresses the closure detection switch 30. Thus, the it can be easily detected whether the cellular phone is folded and completely closed or not according to whether the closure detection switch 30 is ON or OFF.

Figure 2A:
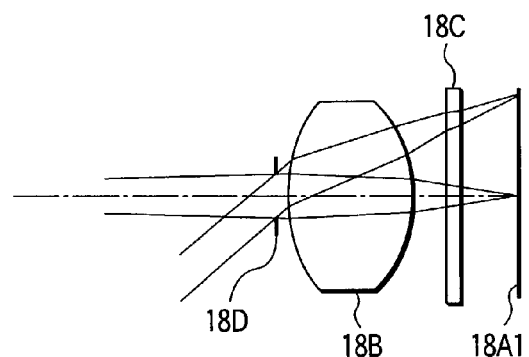
FIG. 2A is a schematic illustration of the optical parameters of the image pickup module.

The image pickup module 18 comprises a filter or cover glass 18C and a fixed aperture 18D as shown in FIG. 2A in addition to the image pickup element 18A and the lens 18B, which are described above. The filter or cover glass 18C is arranged between the focal plane 18A1 where the image pickup element 18A is located and the lens 18B. The fixed aperture 18D is arranged in front of the lens 18B. With this arrangement, the image pickup module 18 shows optical parameters including an object distance of 200 mm, a focal length fl of 4.74 mm and a view angle ω of 38.9°. The total length is 8.7 mm.

Since the image pickup module 18 shows parameters good for shooting an object at a far point in the field of view, the operator can pick up his or her own image and also take a snap shot of the scene surrounding the operator or some other person. The picked up image is stored in the memory (not shown) in the cellular phone. It can be displayed on the display section 16 and/or attached to E-mail to send to some other electronic device.

It is also possible to use the cellular phone as a video phone so that the operator can make a telephone call to another person and display an image of the operator him- or herself on the display section 16 of the cellular phone at the other end of the line, while seeing an image of the person at the other end of the line on the display section 16.

Figure 2B:
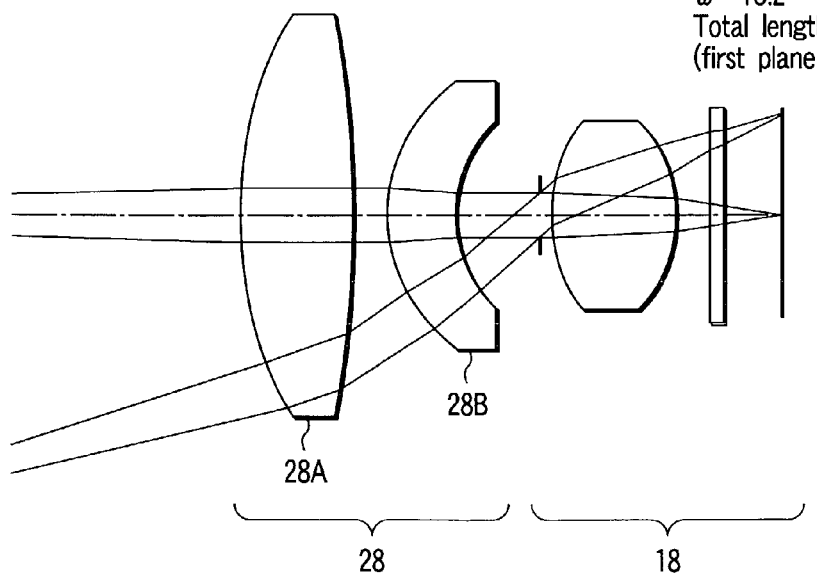
FIG. 2B is a schematic illustration of the synthetic optical effect of the image pickup module and the adapter optical system when the cellular phone is folded.

When the cellular phone is folded and completely closed, the lenses 28A, 28B of the adapter optical system 28 are inserted between the image pickup module 18 and the subject as shown in FIG. 2B. Then, the combined or synthetic optical system shows optical parameters including an object distance of 200 mm, a focal length fl of 8.44 mm and a view angle ω of 15.2°. The total length is 19.5 mm.

Thus, as the cellular phone is folded, the adapter optical system 28 of the lid member 12 is located in front of the image pickup module 18 of the oppositely disposed case 10 and the optical axes of the two systems substantially agree with each other. Then, rays of light entering the image pickup module 18 are changed by the adapter optical system 28 and the combined optical system is adapted to shoot an object at a near point in the field of view.

Figure 3A:
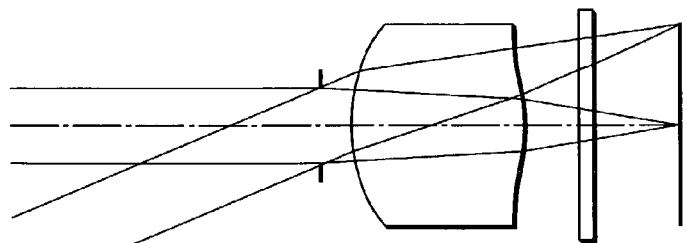
FIG. 3A is a schematic illustration of the optical parameters of an image pickup module when a different lens is used.
Figure 3B:
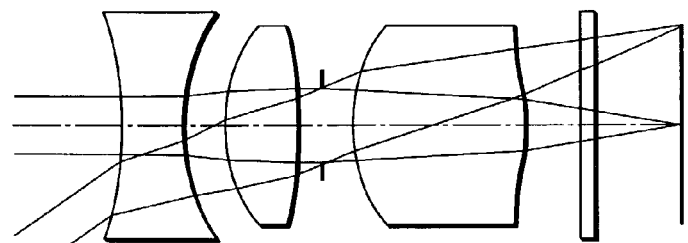
FIG. 3B is a schematic illustration of the synthetic optical effect of the image pickup module of FIG. 3A and an adapter optical system using different lenses when the cellular phone is folded.

FIG. 3A is a schematic illustration of the optical system and the optical parameters of the image pickup module 18 when a different lens is used. With the illustrated arrangement, the image pickup module 18 shows optical parameters including an object distance of ∞, a focal length fl of 7.72 mm and a view angle ω of 25.4°. The total length is 12 mm. As the cellular phone is folded and the optical system is combined with the adapter optical system 28, the optical parameters are modified so as to include an object distance of 200 mm, a focal length fl of 4.74 mm and a view angle ω of 38.9° as shown in FIG. 3B. The total length is then 18.6 mm.

Figure 4:
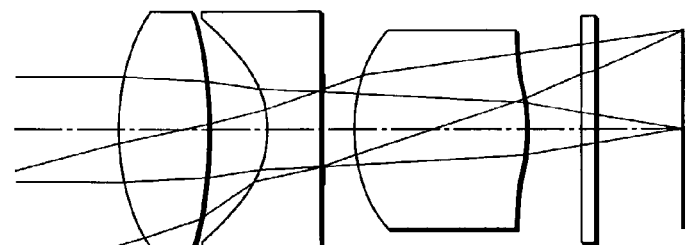
FIG. 4 is a schematic illustration of the synthetic optical effect of the image pickup module of FIG. 3A and an adapter optical system using another lenses when the cellular phone is folded.

Alternatively, the lenses of the adapter optical system 28 may be replaced by those illustrated in FIG. 4. Then, the optical parameters are modified so as to include a focal length fl of 10.43 mm and a view angle ω of 17.6°, while maintaining an object distance equal to ∞ which is same as that of the image pickup module 18 of FIG. 3A (to make the total length equal to 19.4 mm). In other words, the magnification of the optical system can be modified.

Figure 5:
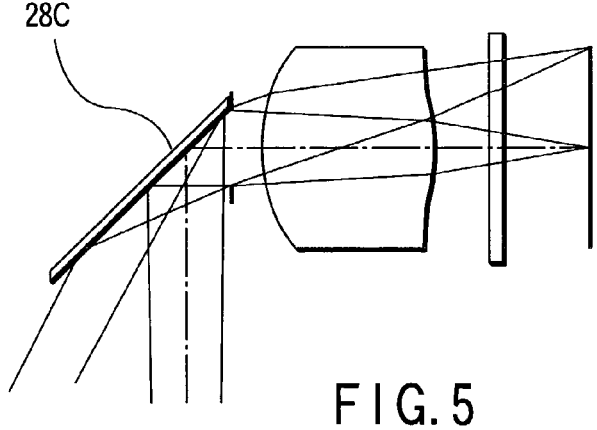
FIG. 5 is a schematic illustration of the synthetic optical effect of the image pickup module of FIG. 3A and an adapter optical system using a mirror or an optical prism when the cellular phone is folded.

It should be noted that the configuration of the adapter optical system 28 is not limited to those described above. It may alternatively comprise a mirror or an optical prism 28C as shown in FIG. 5 that does not have any power but is simply adapted to bend the optical path by 90°. With an adapter optical system 28 having such a configuration, the embodiment can be used as a video phone that picks up an image of the user by the image pickup module 18 when the cellular phone is held open or shoots the background of the user by bending the optical path by the adapter optical system 28 when the cellular phone is folded and then transmits the picked up image to the other end of the line.

While not specifically illustrated in the drawing, the adapter optical system 28 may comprise an optical filter such as an infrared cut filter.

Alternatively, the adapter optical system 28 may be an aperture, or diaphragm. Then, the F-number of the camera is raised to increase the depth of field when the diaphragm is made to show a small aperture.

In this way, the optical parameters of the camera can be modified in various ways by folding the cellular phone and inserting the adapter optical system 28. Thus, the camera of the cellular phone has broad applications.

For example, the cellular phone may be operated as an optical mouse by adopting an adapter optical system 28 that is focused on an object point at a near point in the field of view when the cellular phone is folded.

Figure 6:
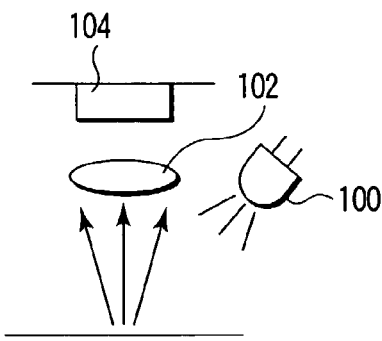
FIG. 6 is a schematic illustration of the principle of the image pickup section of an optical mouse.

Optical mice are well known and commercially available. As illustrated in FIG. 6, an optical mouse is produced by forming an image of an object, which is illuminated by a lighting LED 100, on an image pickup element 104 such as a CMOS sensor, by a condenser lens 102. The distance and the direction of movement of the mouse can be detected by sampling images of the mouse at predetermined regular time intervals and computationally determining the motion vectors from the correlations of the images.

Figure 7:
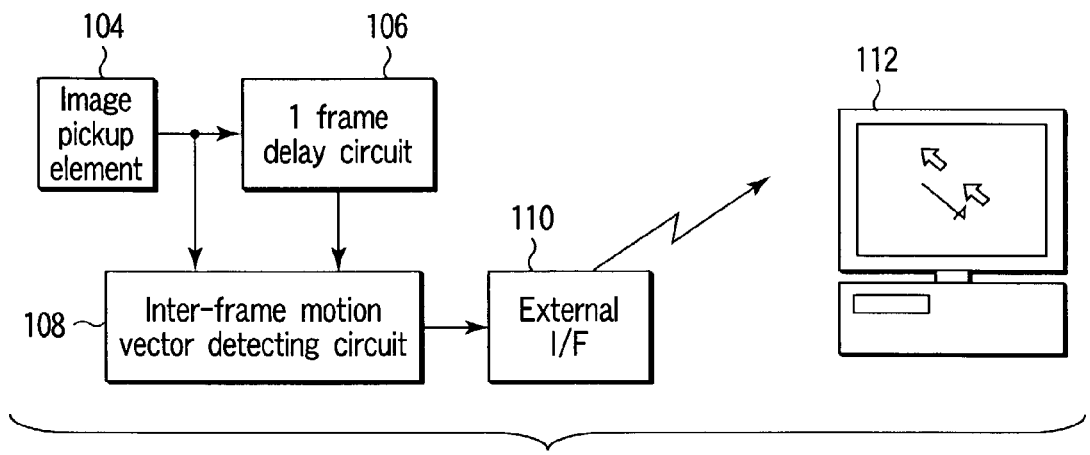
FIG. 7 is a schematic block diagram of an optical mouse, showing its electric system configuration.
Figure 8:
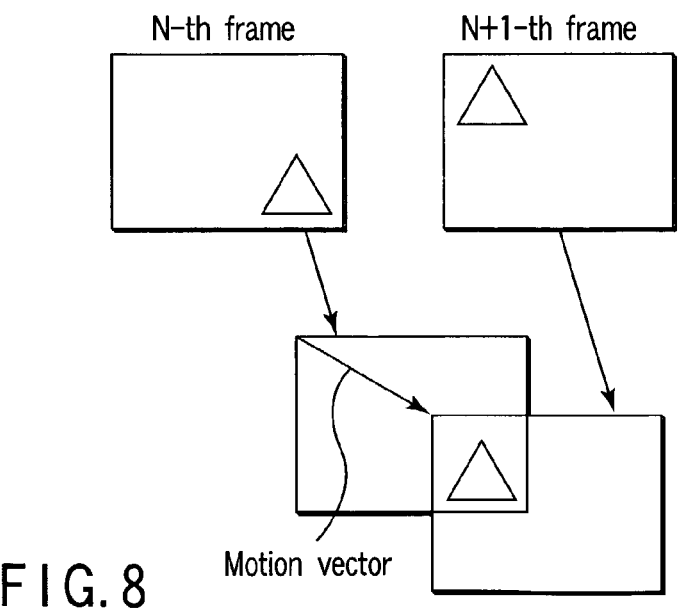
FIG. 8 is a schematic illustration of motion vector.

The condenser lens 102 has a magnification that allows the image pickup element 104 to pickup the movement of an object on (i.e., the scabrous surface of) a table or a sheet of paper and the image picked up by the image pickup element 104 is stored in a 1 frame delay circuit 106, which is a frame memory, as shown in FIG. 7. The object is shot by the image pickup element 104 at predetermined regular time intervals and the image of the most recent frame (the image of the n+1-th frame in FIG. 8) picked up by the image pickup element 104 and the image of the immediately preceding frame (the image of the n-th frame in FIG. 8) stored in the 1 frame delay circuit 106 are input to an inter-frame motion vector detecting circuit 108. The inter-frame motion vector detecting circuit 108 extracts characteristics of the images picked up at predetermined regular time intervals and computationally determines the motion vector (i.e., the direction and the extent of movement) of the object. The obtained motion vector is transmitted to an external electronic device 112, which may typically be a PC, by way of an external interface (I/F) circuit 110, which is output means. The external electronic device 112 performs a processing operation on the movement of the mouse cursor on the basis of the received information on the motion vector. More specifically, the external I/F circuit 110 transmits the information on the motion vector to the external electronic device 112 by way of a wired communication path such as RS232C or USB (universal serial bus) and/or a radio communication path such as IrDA (infrared data association), Bluetooth or radio LAN.

In this way, the optical mouse can obtain information on the relative current position of itself by detecting the relative direction and the relative distance of motion (in other words, the motion vector) of itself from the images of itself picked up at different instants.

Figure 9:
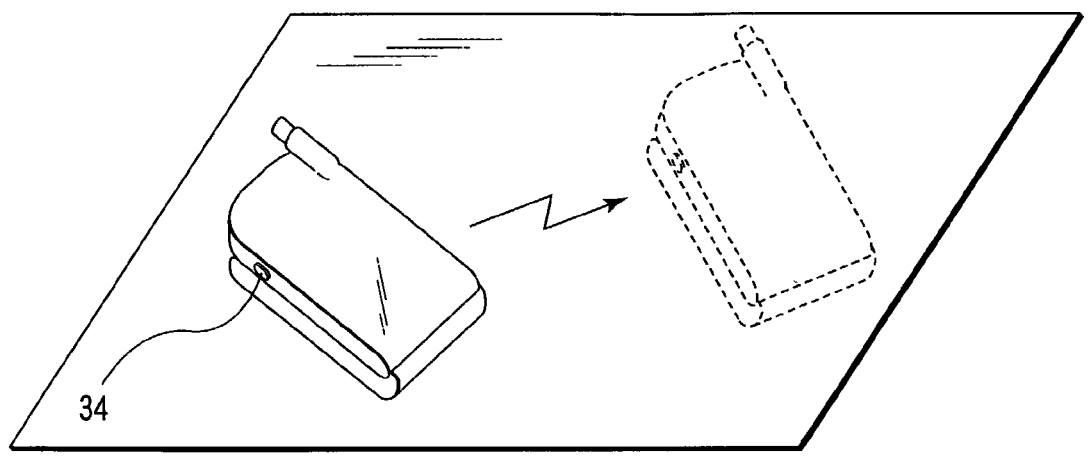
FIG. 9 is a schematic illustration of the first embodiment of foldable cellular phone operating as optical mouse.
Figure 10:
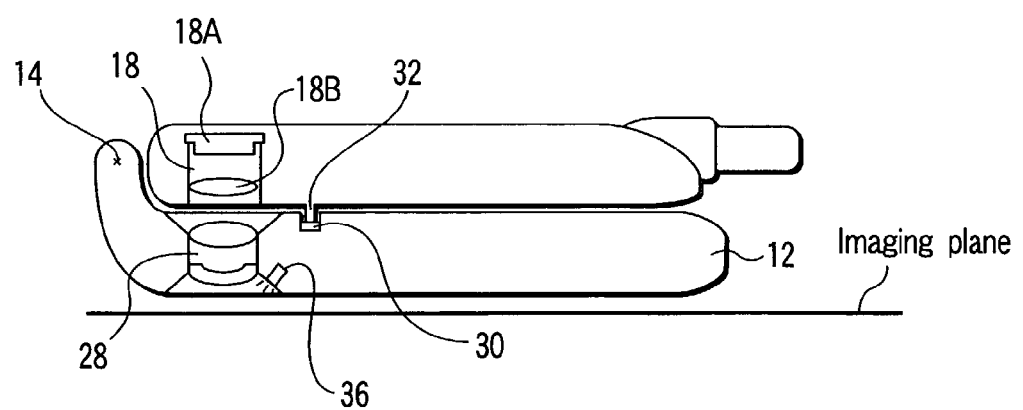
FIG. 10 is a schematic illustration of the lighting LED of a cellular phone operating as optical mouse.

In this embodiment, the case 10 is provided at a lateral side thereof with a button as shown in FIG. 9 in order to make the cellular phone to operate as an optical mouse so that it may be used as mouse button 34. At the same time, as shown in FIG. 10, the lid member 12 is provided at the side of the imaging plane of the adapter optical system 28 with a lighting LED 36 that corresponds to the lighting LED 100 of the above mentioned optical mouse. Thus, the image pickup element 18A of the image pickup module 18 can be used as image pickup element 104 of the above mentioned optical mouse. Note that, in FIG. 10, while the image pickup module 18, the adapter optical system 28 and the lighting LED 36 are supposed to be drawn by broken lines, they are drawn by solid lines in order to clearly illustrate their positional relationship.

Figure 11:
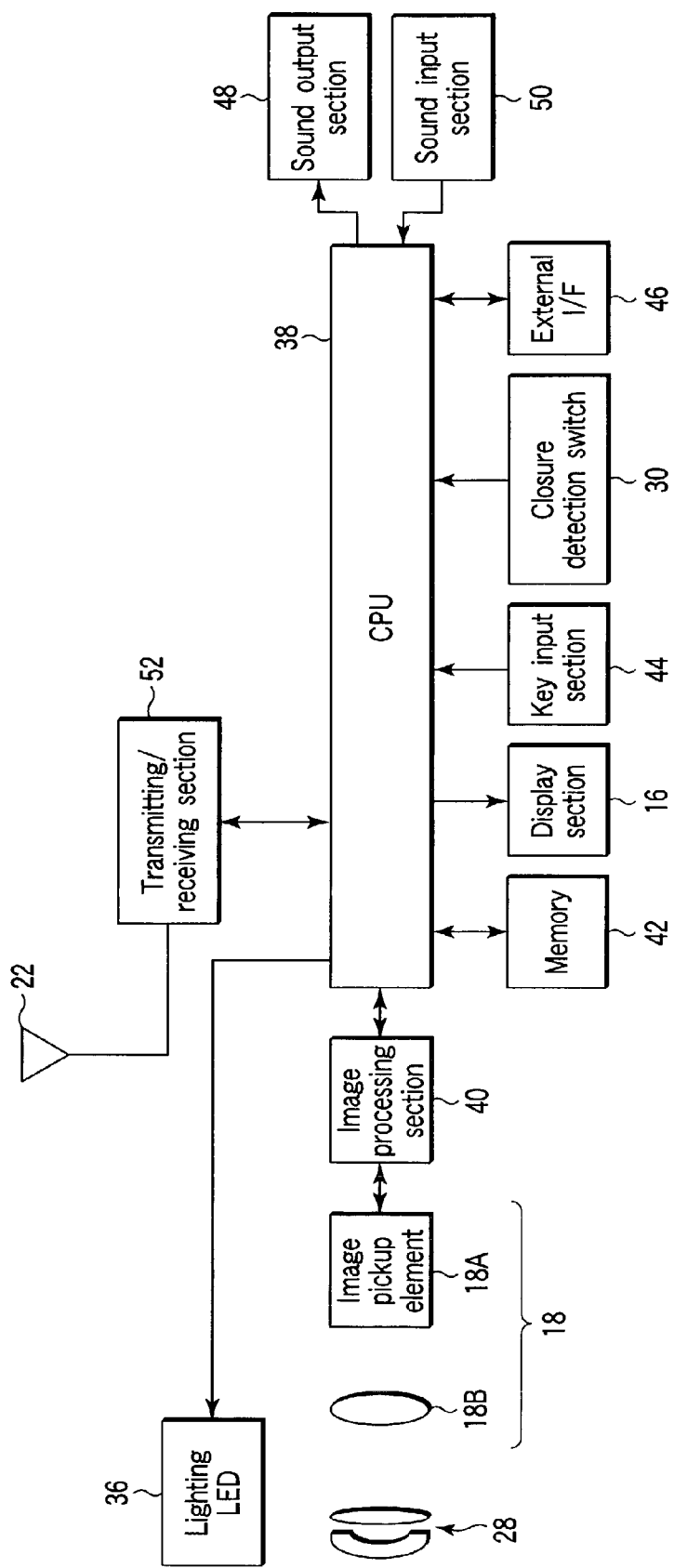
FIG. 11 is a schematic block diagram of a cellular phone operating as optical mouse.

FIG. 11 is a schematic block diagram of a cellular phone that operates also as an optical mouse.

CPU 38 that controls the entire cellular phone is connected to an image processing section 40, a memory 42, a key input section 44, an external I/F 46, a sound output section 48, a sound input section 50 and a transmitting/receiving section 52 in addition to the display section 16, the closure detection switch 30 and the lighting LED 36.

The display section 16 typically comprises an LCD or EL panel and is adapted to display user interface information such as telephone directory and operation menus. The closure detection switch 30 is adapted to detect a condition where the cellular phone is completely folded and closed. The lighting LED 36 illuminates the object being shot by the camera when a near point imaging is performed.

The image processing section 40 processes the image signal from the image pickup element 18A, which typically comprises a CCD or a CMOS sensor and is adapted to transform the light from the object point that is in focus of the lens 18B into an electric signal, to filter the noise of the image and binarize the signal, so as to interface CPU 38 with the image pickup element 18A. Additionally, the image processing section 40 comprises a circuit that operates as 1-frame delay circuit 106 and a circuit that operates as inter-frame motion vector detecting circuit 108 when a near point imaging is performed by inserting the adapter optical system 28 or when the cellular phone is operated as an optical mouse.

The memory 42 stores the picked up images and user information such as telephone directory. The key input section 44 is used to receive inputs by way of the operation keys 24 arranged on the lid member 12 and/or the mouse button 34 arranged on a lateral side of the case 10 and transmit them to the CPU 38.

The external I/F 46 corresponds to the external I/F circuit 110 of the optical mouse. It is an interface to be used for communication between the cellular phone and an external electronic device 112 such as PC. In this embodiment, communication is established by way of a radio communication path such as IrDA, Bluetooth or radio LAN. It may be needless to say that communication may be practiced by way of a wired communication path such as RS232C or USB.

The sound output section 48 comprises the loudspeaker 20 for outputting voice during a telephone conversation and an amplifier. The sound input section 50 comprises the microphone 26 for inputting the user's voice during a telephone conversation and an amplifier.

The transmitting/receiving section 52 is adapted to carry out a processing operation for receiving the voice from the other end of the line and transmitting the user's voice during the telephone conversation.

Figure 12:
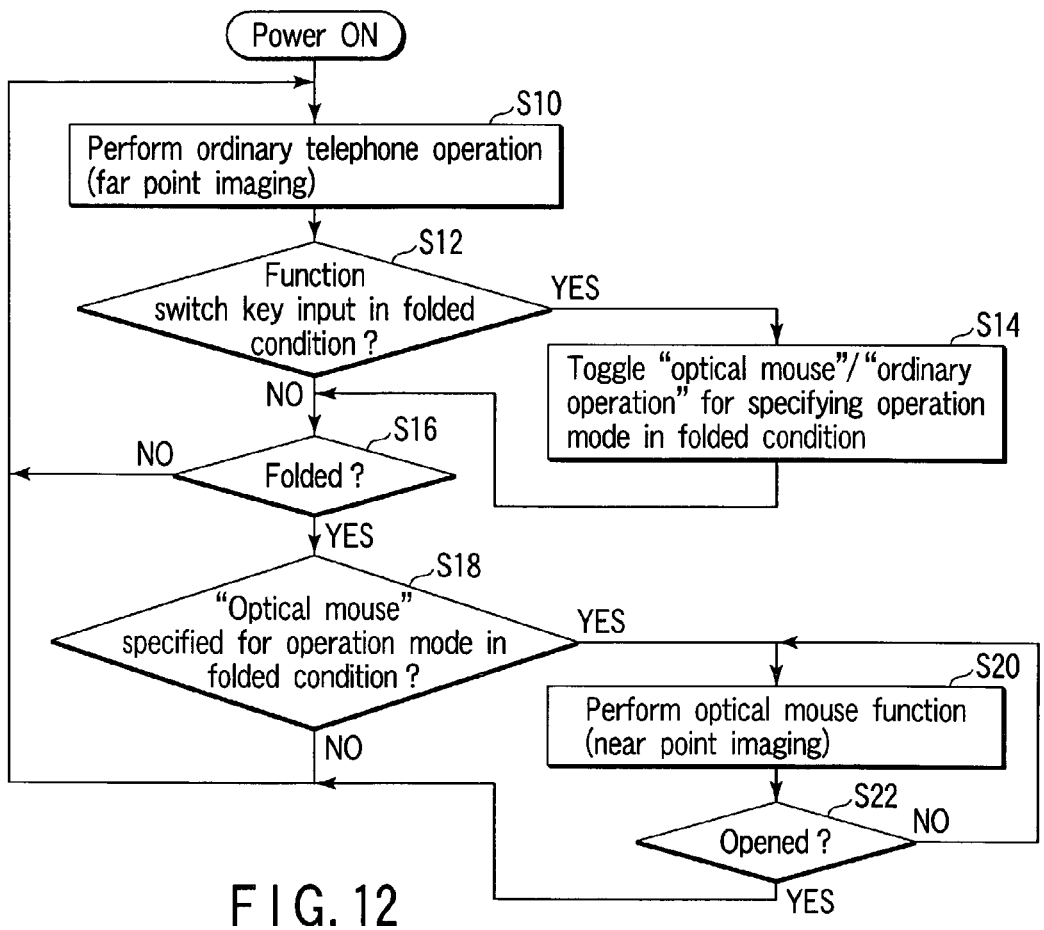
FIG. 12 is a flow chart of the operation of a cellular phone operating as optical mouse.

Now, the operation of the cellular phone having the above described configuration will be described by referring to FIG. 12 showing the operation flow chart of the CPU 38.

Firstly, as the power source of the cellular phone is turned on, the CPU 38 performs an ordinary processing operation necessary for the telephone such as waiting, talking, taking a snap shot or operating as video phone (Step S10). In other words, since the power switch of the foldable cellular phone is normally arranged as one of the operation keys 24 of the lid member 12, the cellular phone needs to be unfolded if the user wants to turn on the power switch. It does not operate as an optical mouse as a matter of course because the optical mouse operates only when the cellular phone is folded and completely closed. Therefore, the CPU 38 operates in the first imaging mode, i.e., a far point imaging operation mode, which is the operation mode for imaging an object at a far point in the field of view in an ordinary telephone operation. Note that, in the far point imaging operation mode, the operation of the lighting LED 36 and that of the external I/F 46 are suspended along with the function of the 1 frame delay circuit and that of the inter-frame motion vector detecting circuit of the image processing section 40.

Then, it is determined if the function switch key is operated or not in the folded condition (Step S12). The function switch key is normally operated by selecting it from a menu by means of a predetermined one of the operation keys 24, although a dedicated key may be provided. If it is determined that the function switch key is not operated, the CPU 38 proceeds to Step S16, which will be described next. If, on the other hand, it is determined that the function switch key is operated, the operation mode for the folded cellular phone is selected by toggling "optical mouse" or "ordinary operation" (Step S14) and the CPU 38 proceeds to Step S16. More specifically, if the function switch key is operated when the function of specifying the operation mode for the folded cellular phone that is stored in a predetermined area of the memory 42 is assigned to "optical mouse", "ordinary operation" is specified for the new operation mode and the specification is stored in the memory 42. If, on the other hand, the function switch key is operated when "ordinary operation" has already been specified as the operation in the operation mode for the folded cellular phone, "optical mouse" is specified for the new operation mode of the folded cellular phone and the specification is stored in the memory 42. In other words, if "optical mouse" is specified for the operation mode of the folded cellular phone or not is determined in this steps S12 and S14.

Then, the CPU 38 determines if the cellular phone is folded or not on the basis of the condition of the closure detection switch 30 (Step S16). If it is determined that the cellular phone is not folded, the CPU 38 returns to the above Step S10 and continues the processing operation for the ordinary telephone function. If, on the other hand, it is determined that the cellular phone is folded, the CPU 38 further determines if "optical mouse" is specified for the operation mode of the folded cellular phone or not (Step S18). If it is determined that "ordinary operation" is specified, the CPU 38 returns to the above Step S10 and continues the processing operation for the ordinary telephone function. In other words, the cellular phone is in the waiting state.

If, on the other hand, it is determined that "optical mouse" is specified for the operation mode of the folded cellular phone, the CPU 38 operates to activate the above described function of the optical mouse, which is good for imaging an object at a near point in the field of view by synthetic optical parameters of the image pickup module 18 and the adapter optical system 28. In other words, the cellular phone is brought into the near point imaging operation mode, or the second imaging mode, good for imaging an object at a near point in the field of view (positional information detection mode) and operates as an optical mouse. In the near point imaging operation mode (positional information detection mode), the operations of the display section 16, the sound output section 48, the sound input section 50 and the transmitting/receiving section 52 are suspended while the operations of the lighting LED 36 and the external I/F 46 are started along with those of the 1 frame delay circuit and the inter-frame motion vector detecting circuit of the image processing section 40 so that the image pickup element 18A may operate at a high frame rate.

Subsequently, the CPU 38 determines if the cellular phone is opened or not on the basis of the condition of the closure detection switch 30 (Step S22). So long as the cellular phone remains in the folded condition, the CPU 38 returns to Step S20 and continues the operation of the optical mouse. If the cellular phone is opened, the CPU 38 returns to Step S10 and performs the processing operation for the ordinary telephone function.

As described above, the first embodiment of foldable cellular phone having a camera feature can be used as radio optical mouse.

Note that, instead of arranging the 1 frame delay circuit 106 and the inter-frame motion vector detecting circuit 108 for the optical mouse in the image processing section 40, the 1 frame delay circuit 106 may be moved into a given area of the memory 42 and the function of the inter-frame motion vector detecting circuit 108 may be realized by software in the CPU 38 if the CPU 38 has a sufficient processing capacity.

A two-level depression type switch may be used for the closure detection switch 30 in such a way that the first and second levels of depression make it operate respectively as closure detection switch and mouse switch and only the first level switch is turned on when the cellular phone is folded, whereas the second level switch is turned on only when the case 10 is further pushed against the lid member 12 toward the image pickup side of the cellular phone. Then, the mouse button 34 can be omitted. Alternatively, a switch that is turned on when the antenna 22 is pushed in may be provided as mouse button 34.

While the user has to decide if he or she uses the device as cellular phone or optical mouse when the device is folded in the above description, such a selection procedure may be omitted.

Figure 13:
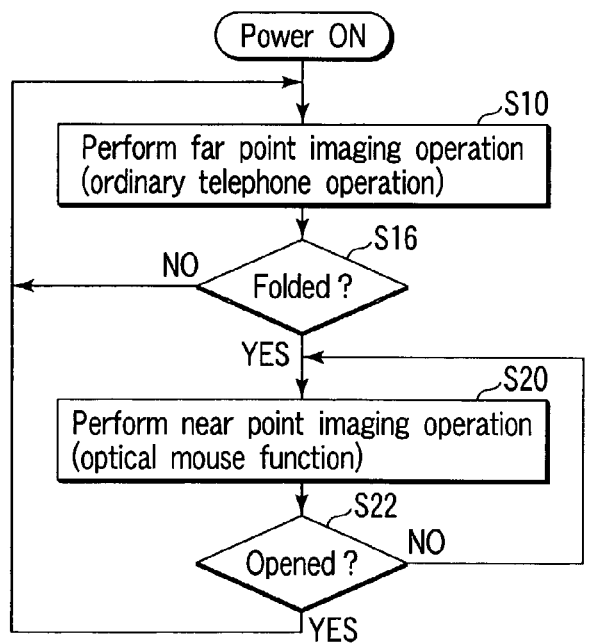
FIG. 13 is a flow chart of the operation of a modified example.

Then, as shown in FIG. 13, as the power source of the cellular phone is turned on, the CPU 38 operates in the far point imaging operation mode, where it performs a processing operation for the ordinary telephone function (Step S10). Then, the CPU 38 determines if the cellular phone is folded or not on the basis of the current status of the closure detection switch 30 (Step S16) and returns to Step S10 to continue the processing operation for the ordinary telephone function if the cellular phone is not folded. On the other hand, if the cellular phone is folded, the CPU 38 performs a processing operation for the function of the optical mouse (Step S20) in the near point imaging operation mode. Thereafter, the CPU 38 determines if the cellular phone is folded or not on the current status of the closure detection switch 30 (Step S22) and returns to Step S20 to continue the processing operation for the function of optical mouse so long as the cellular phone is folded. When the cellular phone is opened, the CPU 38 returns to Step S10 and performs a processing operation for the ordinary telephone function.

With the above described arrangement, it is now possible to switch the function of an ordinary cellular phone having a camera feature to that of a radio optical mouse or vice versa simply by opening the foldable cellular phone or closing it, whichever is appropriate.

While the closure detection switch 30 is arranged on the lid member 12 and the closure detection switch depressing production 32 is arranged on the case 10 in this embodiment, it may alternatively be so arranged that the closure detection switch 30 is disposed on the case 10 and the closure detection switch depressing projection 32 is disposed on the lid member 12. Alternatively, a known mechanical switch that is turned on when the lid member 12 is rotated by a given angle in the course of a folding action (an action for making the optical axis of the lens 18B substantially agree with that of the adapter optical system 28) may be provided near the rotary shaft 14 of the lid member 12 and the case 10.

It may be so arranged that the image pickup module 18 is disposed at a member carrying the operation keys 24 and the adapter optical system 28 is disposed at another member carrying the display section 16. Then, the member carrying the operation keys 24 and the image pickup module 18 is referred to as the case, while the member carrying the display section 16 and the adapter optical system 28 is referred to as lid member.

2nd EMBODIMENT

Now, the second embodiment of the invention will be described below.

The second embodiment is designed to adopt a code reading mode as the near point imaging operation mode, which is the second imaging mode. More specifically, this embodiment is designed to operate as a code reading apparatus to be adapted to read an optically readable code such as a bar code or a dot code as its adapter optical system 28 can image an object located at a near point of the field of view when it is folded.

The technology of optically readable recording on a recording medium such as a sheet of paper a dot code that is formed by a number of dots arranged according to a predetermined format is well known. With such a dot code, the presence or absence of a dot on each given spot is defined as "1" or "0" of encoded data that may contain sound, image and/or text. U.S. Pat. No. 5,896,403 and U.S. Pat. No. 5,866,895 disclose such a dot code.

Figure 14:
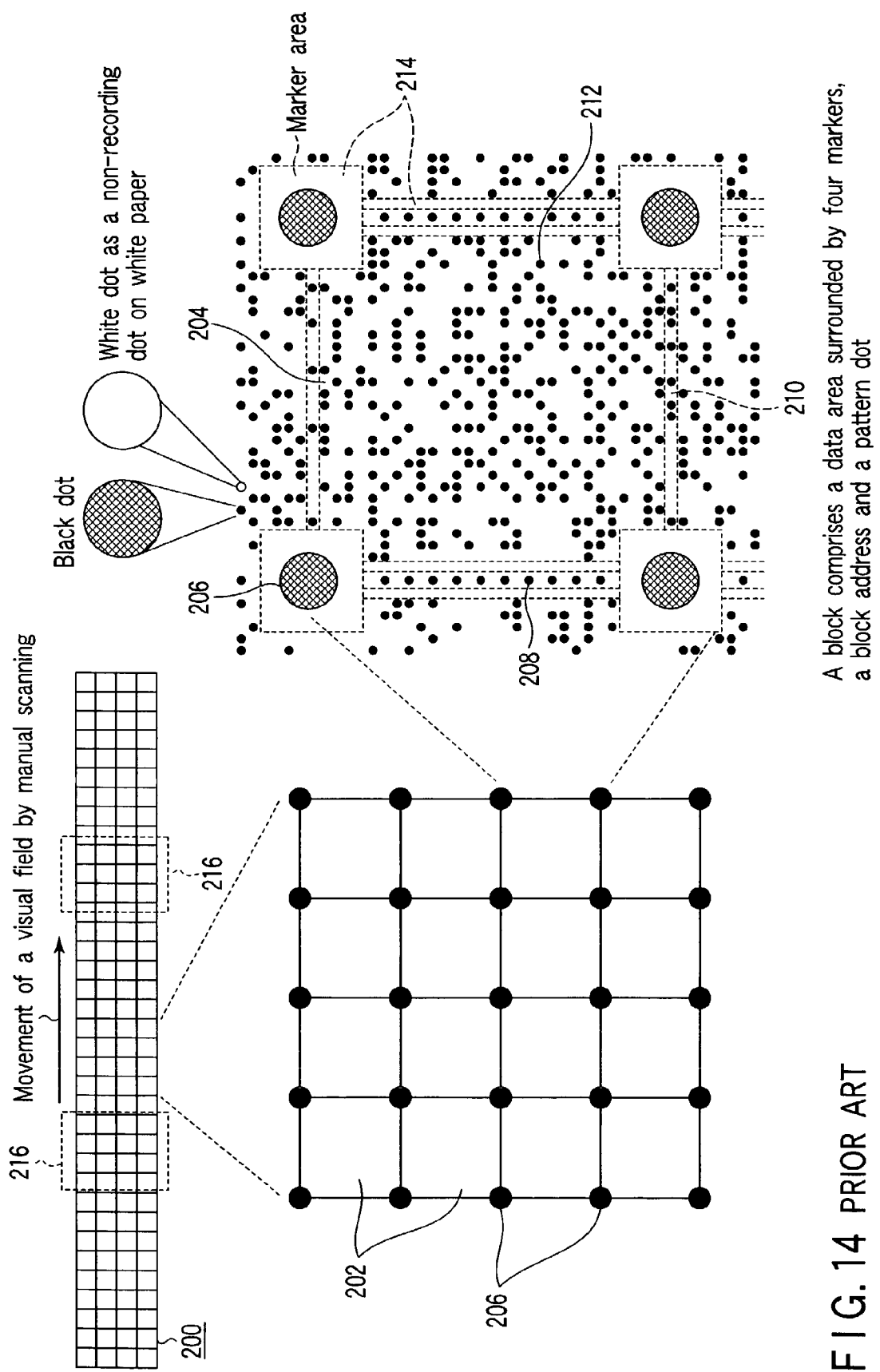
FIG. 14 is a schematic illustration of the configuration of the physical format of a dot code that is read by the second embodiment of portable information terminal device of the present invention, which is a foldable cellular phone having a camera feature.

FIG. 14 schematically illustrates the physical format of a dot code as disclosed by the U.S. Patents.

A dot code 200 comprises a plurality of blocks 202 that are arranged side by side. Each block 202 has a data dot pattern region 204 in which black dots and white dots (white dots in FIG. 14 are unrecorded dots or formed by the color of the recording medium itself) are arranged two-dimensionally according to a predetermined format and each black dot and each white dot represent "1" or "0" respectively, or vice versa, of encoded data that may contain sound. Each block 202 additionally has markers 206, pattern dots 208 and a block address pattern 210. Each marker 206 is disposed at a corner of a block and formed by consecutively arranging a predetermined number of black dots. It is used as a reading reference point for reading each of the dots (data dot 212) in the data dot pattern region 204. The pattern dots 208 are arranged between two adjacent markers 206 so as to locate the reading reference point more accurately, and are a collection of isolated dots surrounded by a white region. The block address pattern 210 is also arranged between two adjacent markers 206 so as to identifying each block 202 and contains an error detection or error correction code. The markers 206 and the pattern dots 208 are surrounded by a dot non-arrangement area 214 that is a white area, so that they may be detected easily.

Thus, if the size of the dot code 200 is larger than the field of view 216 of the code reading apparatus and hence the latter cannot pick up an image of the entire dot code 200 by a single shot, the original data represented by the dot code 200 can be restored by collecting the data of the blocks only if the blocks are detected on a block by block basis with the data dot 212 contained in each block and the address assigned to the block 202. Therefore, a large volume of data that may contain sound can be recorded on a sheet of paper and the data can be read easily by manually driving a code reading apparatus to scan the data.

Figure 15:
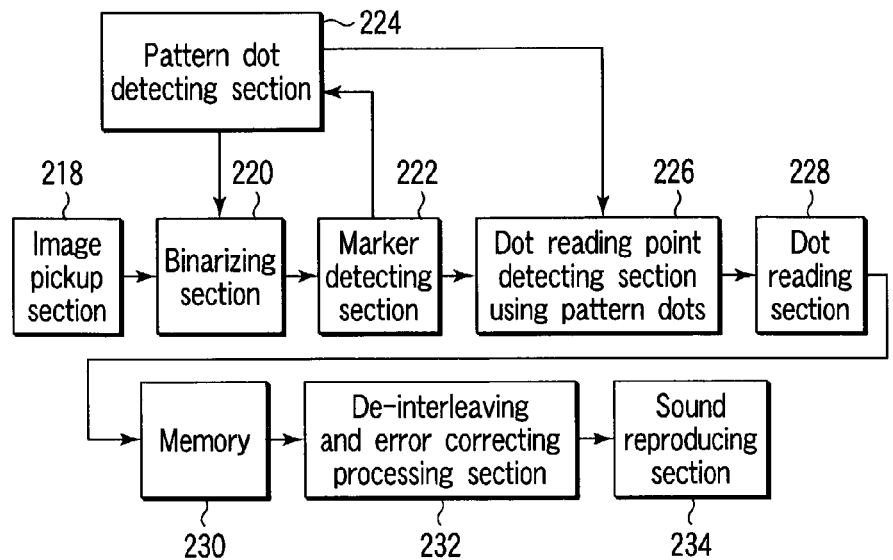
FIG. 15 is a schematic block diagram of a known code reading apparatus adapted to read a dot code as illustrated in FIG. 14.

U.S. Pat. No. 5,943,448 discloses a code reading apparatus adapted to read such a dot code 200. FIG. 15 is a schematic block diagram of a code reading apparatus disclosed by the above identified U.S. Patent.

More specifically, the code reading apparatus comprises an image pickup section 218, a binarizing section 220, a marker detecting section 222, a pattern dot detecting section 224, a dot reading point detecting section 226, a dot reading section 228, a memory 230, a de-interleaving and error correcting processing section 232 and a sound reproducing section 234. The image pickup section 218 includes a lighting section comprising an LED or the like for illuminating a dot code 200, an optical system for focusing reflected light from the dot code 200 and an area sensor such as a CCD for picking up an image focused by the optical system. The binarizing section 220 is designed to perform a binarizing processing operation on the image signal output from the image pickup section 218, using a predetermined threshold value for binarization. The marker detecting section 222 detects the markers 206 from the binarized image data output from the binarizing section 220 as a result of the binarizing processing operation. The pattern dot detecting section 224 detects the pattern dots 208 on the basis of the markers 206 detected by the marker detecting section 222 and the format information given to it in advance. The dot reading point detecting section 226 computationally determines the reading point of each data dot 212 from the pattern dots 208 detected by the pattern dot detecting section 224. The dot reading section 228 reads each of the data dots 212 by referring to the reading points of the data dots 212 obtained by the dot reading point detecting section 226 and outputs the data dot, assigning "1" or "0" to it. The memory 230 temporarily stores the data output from the dot reading section 228. The de-interleaving and error correcting processing section 232 reads out the data from the memory 230 and performs an de-interleaving operation and an error correcting processing operation, typically using Reed-Solomon codes. The sound reproducing section 234 expands the data that has been subjected to the error correcting processing operation to restore the original data and reproduces/outputs the original sound data.

The second embodiment is adapted to make the image pickup module 18, the adapter optical system 28 and the lighting LED 36 operate as the image pickup section 218 of a code reading apparatus such as the one described above when the cellular phone is folded and made to operate to pick up an image of an object at a near point. It is also adapted to make the image processing section 40 operate as the binarizing section 220 of the code reading apparatus. In the same way, the CPU 38 operates as the marker detecting section 222, the pattern dot detecting section 224, the dot reading point detecting section 226, the dot reading section 228 and the de-interleaving and error correcting processing section 232, while the memory 42 operates as the memory 230 and the sound output section 48 operates as the sound reproducing section 234 of the above code reading apparatus. Thus, the cellular phone operates as a code reading apparatus when it is folded. Preferably, the case 10 is provided with a scan start button just like the mouse button 34 so that the image pickup module 18 may not immediately repeat an imaging operation (code reading operation) when the cellular phone is folded but do so only when the scan start button is depressed.

Alternatively, the reproduced sound data and other data may be transmitted to an external electronic device 112 by way of the external I/F section 46 so that the external electric device 112 may operate as the sound reproducing section 234.

The data recorded as a dot code 200 is not limited to sound data and may be image data and/or text data. If so, the reproduced image data and/or the text data is also stored in the memory 42 and the display section 16 displays the data stored in the memory 42 when the cellular phone is unfolded. Alternatively, the reproduced data may be transmitted to an external electronic device 112 by way of the external I/F section 46 so that the external electric device 112 may display it.

Dot code 200 may be used to record various data such as telephone directory data, URL (uniform resource locator) data showing addresses on the Internet and programs that can be executed by the cellular phone or by an external electronic device. If a telephone directory data is recorded, the reproduced telephone directory data may be added to the telephone directory data already stored in the memory 42. Alternatively, the reproduced telephone directory data may be temporarily stored in some other means without being registered in the memory 42 and the transmitting/receiving section 52 may be driven to make a phone call, using the temporarily stored telephone directory data when the cellular phone is unfolded next time. If a URL data is recorded and reproduced, it may be temporarily stored in the memory 42 and, when the cellular phone is unfolded next time, it may be used for an operation of viewing the site indicated by the URL. If a program is recorded and reproduced, it may be temporarily stored in the memory 42 and, when the cellular phone is unfolded next time, the CPU 38 may execute the program or transmit it to an external electronic device 112 by way of the external I/F 46 and cause the external electronic device 112 to execute the program.

It may be needless to mention that this embodiment of a portable information terminal device having a camera feature can operate as a code reading apparatus for reading an optically readable code other than a dot code 200. When reading a one-dimensional bar code that extends beyond the field of view, the memory 42 stores a plurality of images of the bar code and the device can restore the large original bar code by combining the stored images. It is also possible to arrange the embodiment in such a way that rays of light from the lighting LED 36 are converged into a beam and projected so that the device may operate like a so-called pen-type bar code reader and read the bar code.

3rd EMBODIMENT

Now, the third embodiment of the invention will be described below.

This third embodiment is adapted to detect a fingerprint and identify the user by the adapter optical system 28 that can pick up an image of an object located at a near point when the cellular phone is folded.

Figure 16:
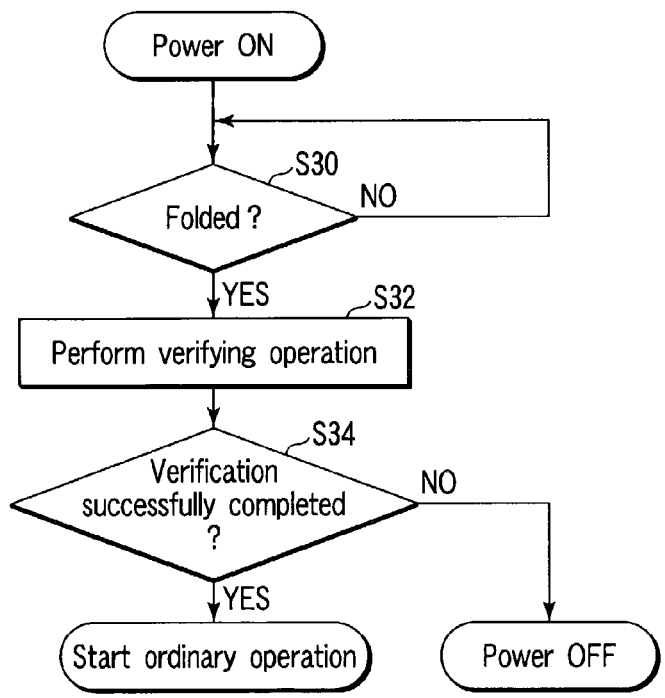
FIG. 16 is a flow chart of operation of the third embodiment of portable information terminal device of the present invention, which is a foldable cellular phone having a camera feature.

Referring to FIG. 16 illustrating a flow chart of operation of this embodiment, as the power source of the cellular phone is turned on, the CPU 38 determines the current status of the closure detection switch 30 and waits until the cellular phone is folded (Step S30). In other words, if the cellular phone is unfolded and the power supply key, which is one of the operation keys 24, is turned on, the cellular phone is still not ready for operation.

As the cellular phone is folded, the image pickup module 18, which is now combined with the adapter optical system 28 so as to be able to pick up an image of an object located at a near point, picks up an image of a fingerprint of and identifies the user (Step S32). Since the operation of detecting a person's fingerprint to identify him or her is well known, it will not be described here any further.

Then, the CPU 38 determines if the operation of identifying the user has successfully completed or not (Step S34) and starts a normal operation for making the cellular phone ready for use only when the identifying operation has successfully completed. In other words, the power source is turned off when the identifying operation has not completed successfully.

4th EMBODIMENT

Now, the fourth embodiment of the invention will be described below.

While the first through third embodiments are foldable cellular phones, this invention is applicable to a flipper type cellular phone as shown in FIG. 17 or to a cellular phone having a sliding lid shown in FIGS. 18A and 18B (which is a cross sectional view taken along line B—B in FIG. 18A).

Then, an image pickup module 18 is arranged at the case 10 and an adapter optical system 28 is arranged on the flipper or the sliding lid as the lid member 12. In the case of FIG. 17, the lid member 12 is linked to the case 10 by the rotary shaft 14 so that it may swing in the directions indicated by a two-directional arrow there. In the case of FIGS. 18A and 18B, the lid member 12 is made to be able to slide relative to the case 10 by the engaging sections 54 in the directions indicated by a two-directional arrow there.

Since the flipper and the sliding lid that are lid members 12 are thin if compared with the lid member 12 of the above described first embodiment, it may be structurally difficult to arrange electric wires and a lighting LED 36 there. Therefore, a lighting LED 36 is arranged at the case 10 of this embodiment and the lid member 12, which is either a flipper or a sliding lid, is provided with a light transmitting window 56 at a position corresponding to the lighting LED 36.

Furthermore, while not shown, since the lid member 12 of the flipper type cellular phone of FIG. 17 is thin, a closure detection switch 30 is arranged at the case 10, while a closure detection switch depressing projection 32 is arranged at the lid member 12. Alternatively, a known mechanical switch that is turned on when the lid member 12 is rotated by a given angle in the course of a folding action may be provided near the rotary shaft 14.

In the case of a cellular phone provided with a sliding lid as shown in FIGS. 18A and 18B, a mechanical switch that is turned on or off when the lid member 12 is completely closed or opened relative to the case 10 may be provided. Alternatively, there may be provided a switch that can detect an on-going sliding motion of the lid that is on the way of being opened or closed.

With the above described arrangement, it is possible to provide a cellular phone with the function of an optical mouse, that of a code reading apparatus or that of detecting a fingerprint of and identifying a person as described above by referring to the first through third embodiment if it is a flipper type cellular phone or a cellular phone provided with a sliding lid.

5th EMBODIMENT

Now, the fifth embodiment of the invention will be described below.

The above described first through fourth embodiments are cellular phones operating as portable information terminal devices. However, the present invention is by no means limited to cellular phones and equally applicable to small personal computers such as note PCs, PDAs and hand-held type PCs that are of the foldable type.

Figure 19:
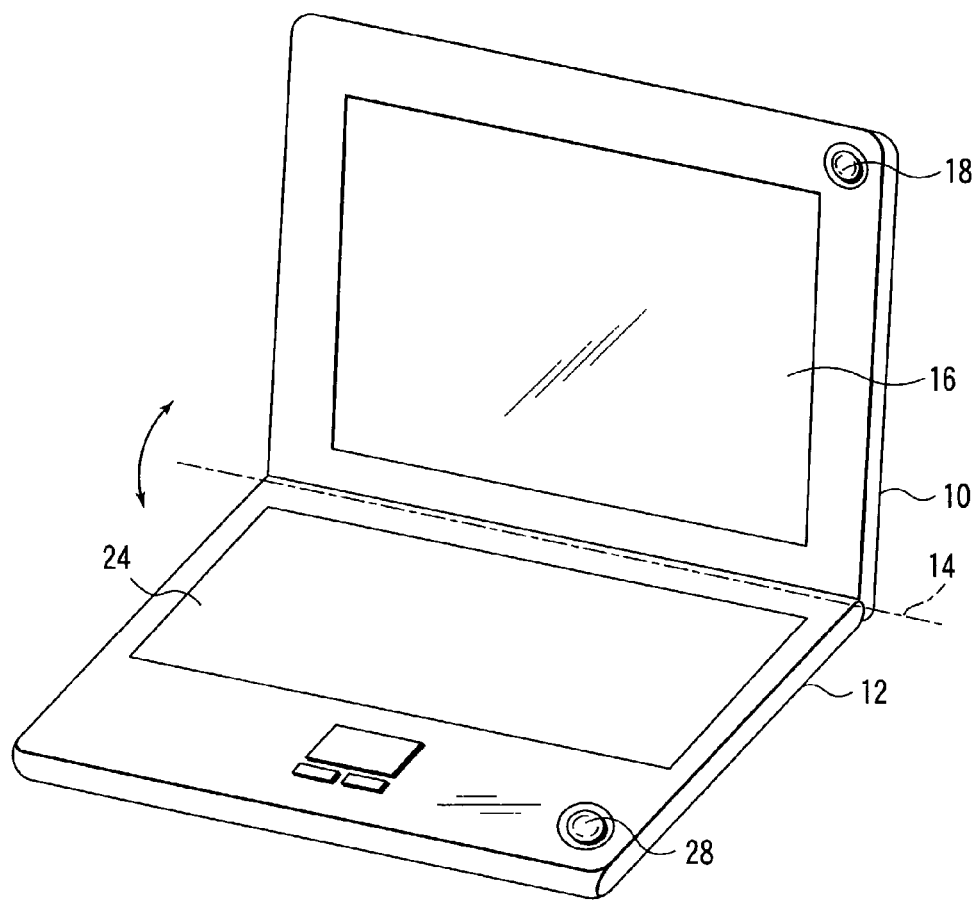
FIG. 19 is a schematic perspective view of a device having a folding mechanism as the fifth embodiment of portable information terminal device having a camera of the present invention.

With any of such devices, an image pickup module 18 is arranged at the case 10 that carries a display section 16, while an adapter optical system 28 is arranged at the lid member 12 carrying operation keys 24 as shown in FIG. 19.

Thus, it is possible to provide a portable information terminal device with the function of an optical mouse, that of a code reading apparatus or that of detecting a fingerprint of and identifying a person as described above by referring to the first through third embodiment if it is a device of any of the above listed types.

6th EMBODIMENT

Now, the sixth embodiment of the invention will be described below.

In this sixth embodiment, the lighting LED 36 of any of the preceding embodiments is replaced by a back light of an LCD for the display section 16.

Figures 20A, 20B:
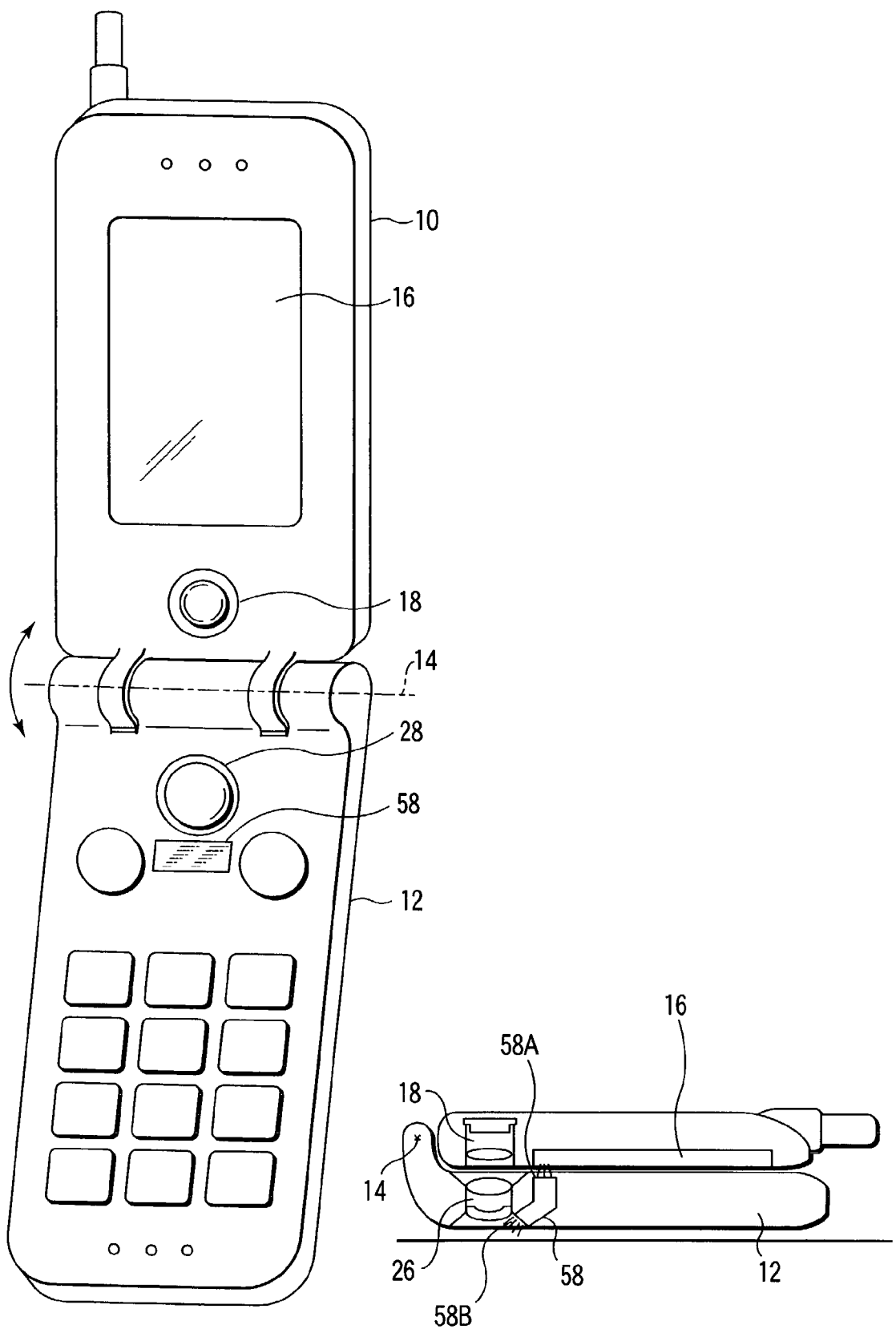
FIG. 20A is a schematic perspective view of the sixth embodiment of portable information terminal device of the present invention, which is a foldable cellular phone having a camera feature.
FIG. 20B is a schematic illustration of the relationship of the light-conducting member, the display section and the adapter optical system of the sixth embodiment, which is a cellular phone, shown in a folded condition.

FIGS. 20A and 20B schematically illustrate this embodiment. Referring to FIGS. 20A and 20B, the lid member 12 is provided with a light-conducting member 58 having a condensing plane 58A at a position that comes to face the display section (LCD having a back light) 16 of the case 10 when the cellular phone is folded. The light-conducting member 58 has a condensing plane 58A arranged at the side of the lid member 12 that faces the display section 16 and a light emitting plane (diffusing plane) 58B arranged at the rear side of the lid member 12 so that light may be led to a near shooting area of the image pickup module. The light-conducting member 58 may be formed by bundling optical fibers or realized as a hole having a mirror-polished inner surface. Note that, in FIG. 20B, while the display section (LCD having a back light) 16, the image pickup module 18, the adapter optical system 28 and the light-conducting member 58 are supposed to be drawn by broken lines, they are drawn by solid lines in order to clearly illustrate their positional relationship.

With the above described arrangement of using a light-conducting member 58, part of the LCD display surface of the display section 16 comes to face the condensing plane 58A of the light conducting member 58 when the cellular phone is folded. Then, rays of light coming from the light-emitting back light of the LCD are partly condensed by the condensing plane 58A of the light-conducting member 58 and led to the rear surface of the lid member 12 to illuminate a near shooting area of the image pickup module 18.

Therefore, the light-conducting member 58 can be used for illumination when the cellular phone is used as an optical mouse as in the case of the first embodiment or when it is used as a code reading apparatus for reading a code as in the case of the second embodiment.

The back light of an LCD is usually designed to diffuse light from a plurality of LEDs and illuminate uniformly the entire LCD screen. Therefore, it may be so arranged that only some of the LEDs of the back light that are adapted to illuminate a peripheral area of the LCD screen that faces the light-conducting member 58 are turned on, to reduce the power consumption.

As described above, with the sixth embodiment, while the near shooting area that is shot when the cellular phone is folded requires illumination because it is shadowed by the cellular phone main body and not illuminated by light from the surrounding area, the back light of the LCD of the display section 16 is utilized for illumination so that it is not necessary to provide a dedicated lighting device for lighting the near shooting area.

Additionally, this embodiment is feasible if the lid member 12 is a flipper or a sliding lid and thin, making it structurally difficult to arrange light emitting members such as LEDs and electrically wire them there, as in the case of the above described fourth embodiment.

The light source is not necessarily limited to the back light of an LCD of the display section 16, and light emitted from the LEDs that is used to illuminate the operation keys 24 may also be utilized.

7th EMBODIMENT

Now, the seventh embodiment of the invention will be described below.

FIGS. 21A through 21E are schematic perspective views of the seventh embodiment of portable information terminal device having a camera feature according to the invention, which is a cellular phone. FIGS. 22A and 22B illustrate the positional relationship between the image pickup module and the adapter optical system of the cellular phone which is folded in an unreversed condition and in a reversed condition respectively. Note that, in FIGS. 22A and 22B, the display section 16, the image pickup module 18, the operation keys 24 and the adapter optical system 28 are supposed to be drawn by broken lines, they are drawn by solid lines in order to clearly illustrate their positional relationship.

Figure 21A:
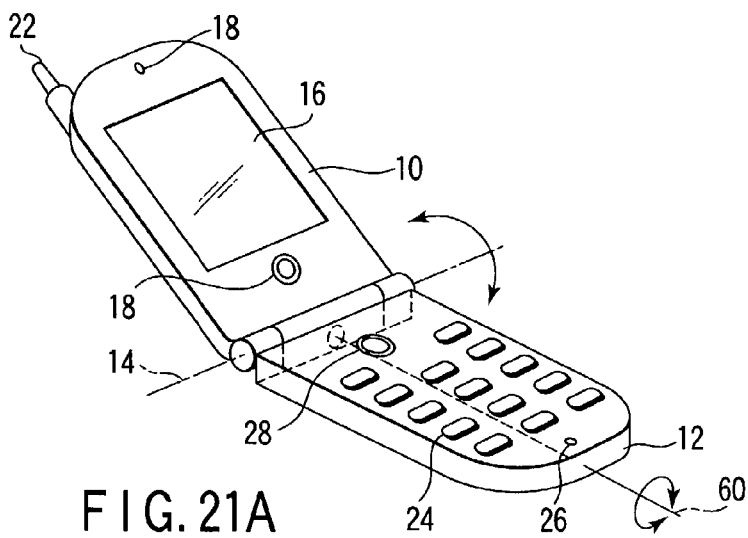
FIGS. 21A through 21E are schematic perspective views of a foldable cellular phone as the seventh embodiment of a portable information terminal device having a camera feature of the present invention.
Figure 22A:
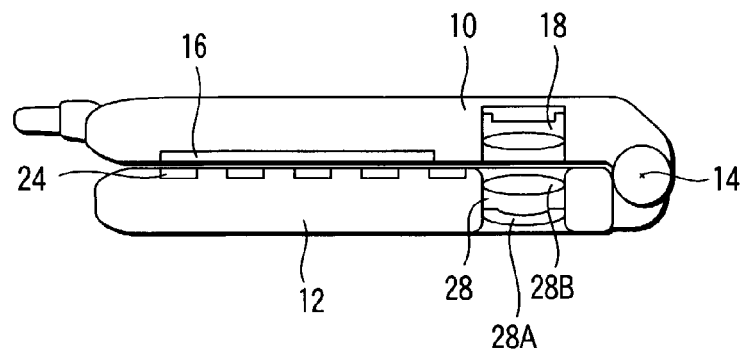
FIG. 22A is a schematic illustration of the seventh embodiment, illustrating the positional relationship of the image pickup module and the adapter optical system when the cellular phone is folded in an unreversed condition.
Figure 22B:
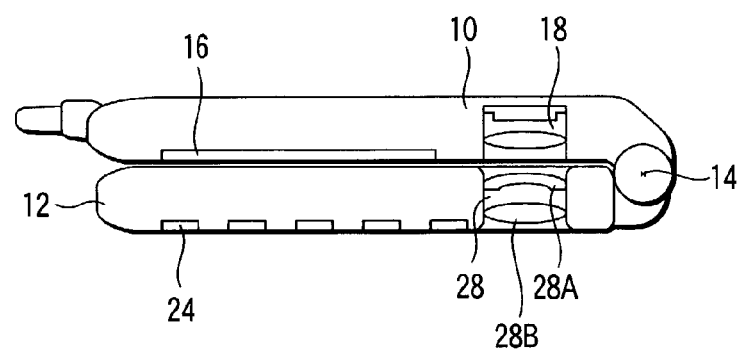
FIG. 22B is a schematic illustration of the seventh embodiment, illustrating the positional relationship of the image pickup module and the adapter optical system when the cellular phone is folded in a reversed condition.

Thus, the cellular phone comprises a case 10 and a lid member 12 that are linked to each other so as to be foldable relative to each other and rotatable relative to each other by more than 180° as indicated by two two-directional arrows in FIG. 21A. More specifically, the case 10 and the lid member 12 are linked to each other by two rotary shafts 14 and 60 so as to be rotatable (displaceable) in two directions.

Figure 23:
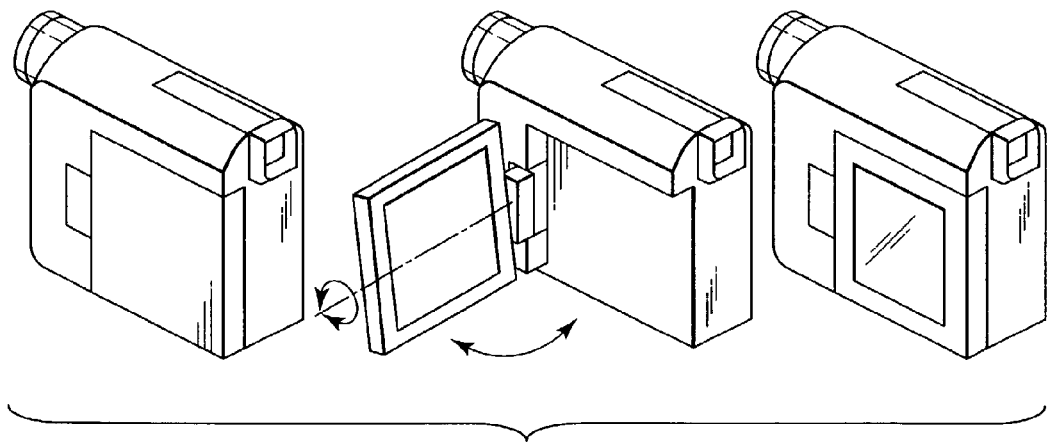
FIG. 23 is a schematic illustration of the link mechanism of the revolving swing-door type display panel of a commercially available handy video camera.

Such a link mechanism is popularly used in, for example, handy video cameras that are linked to corresponding display panels in such a way that the display panel can be freely opened/closed and also rotated relative to the video camera as shown in FIG. 23.

Figure 21B:
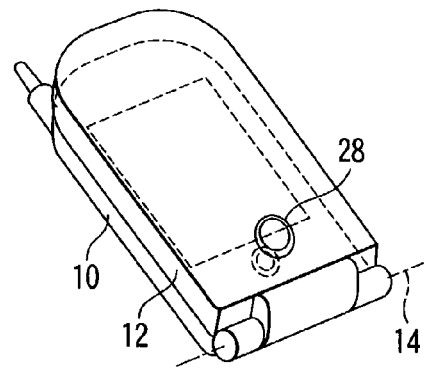
Figure 21C:
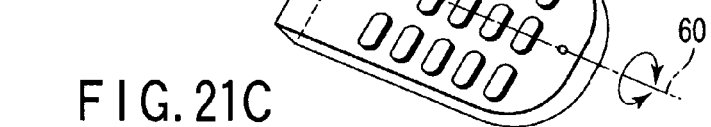
Figure 21D:
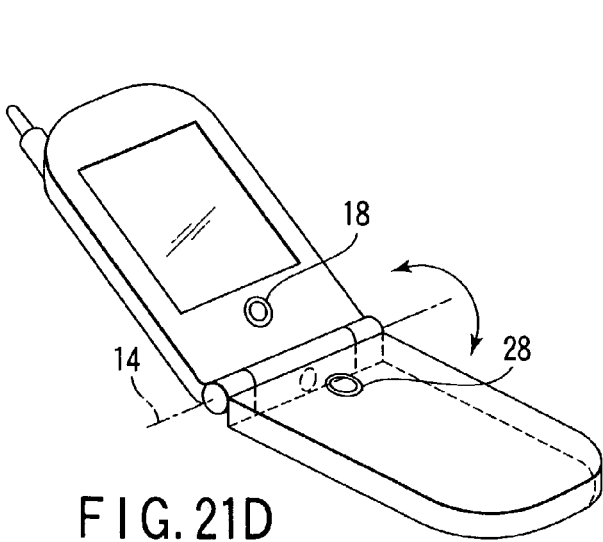
Figure 21E:
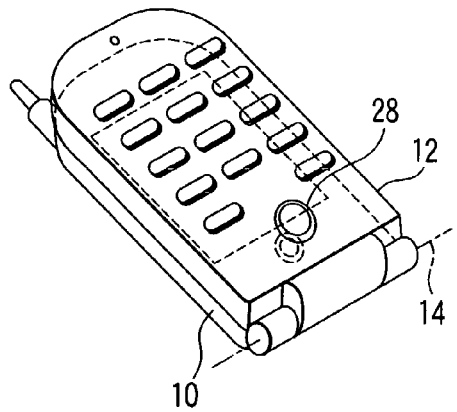

Thus, the lid member 12 can be folded relative to the case 10 in an unreversed condition where the side carrying the operation keys 24 and the microphone 26 faces; inside as shown in FIG. 21B or can be rotated by 180° and folded relative to the case 10 with the rear side of the lid member 12 facing inside as shown in FIG. 21E.

Additionally, the adapter optical system 28 arranged on the lid member 12 is located at a position that substantially agrees with the optical axis of the image pickup module 18 arranged in the case 10 regardless of whether the lid member 12 is folded in an unreversed condition or in a reversed condition as shown in FIGS. 22A and 22B respectively. The adapter optical system 28 typically comprises a plurality of lenses 28A, 28B so as to transmit lit from a side of the lid member 12 to the other or vice versa. In other words, when the lid member 12 is folded in an unreversed condition, light strikes the rear surface of the lid member 12 and arrives at the image pickup module 18 arranged at the case 10 (1st condition). When, on the other hand, the lid member 12 is folded in a reversed condition, light strikes the front surface of the lid member 12 and arrives at the image pickup module 18 of the case 10 (2nd condition).

Figure 24A:
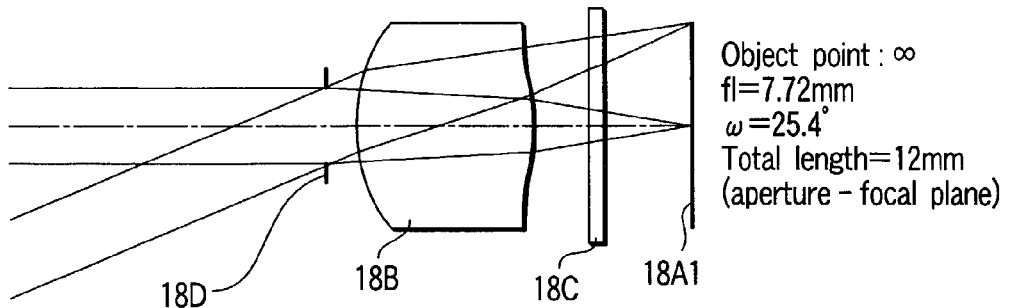
FIG. 24A is a schematic illustration of the optical parameters of the image pickup module of the seventh embodiment, which is a cellular phone.

As shown in FIG. 24A, the image pickup module 18 includes a lens 18B, a filter or glass cover 18C arranged between the lens 18B and the focal plane 18A1 where an image pickup element 18A is arranged, and a fixed aperture 18D arranged in front of the lens, and has optical parameters including an object distance of $\infty$, a focal length fl of 7.72 mm and a view angle $\omega$ of 25.4°. The total length of the image pickup module 18 is 12 mm.

Since the image pickup module 12 has optical parameters good for imaging a far point in the field of view, it is possible to direct it to and shoot the operator him- or herself or take a snap shot of the surroundings of the operator, which may include the background and other people. The image picked up by the image pickup module 18 can be stored in the memory 42 of the cellular phone and displayed on the display section 16 or transmitted to another electronic device as an attachment to an E-mail. It is also possible to use the cellular phone as a video phone so that the operator can make a telephone call to another person and display an image of the operator him- or herself on the display section 16 of the cellular phone at the other end of the line, while seeing an image of the person at the other end of the line on the display section 16 of his or her own cellular phone.

Figure 24B:
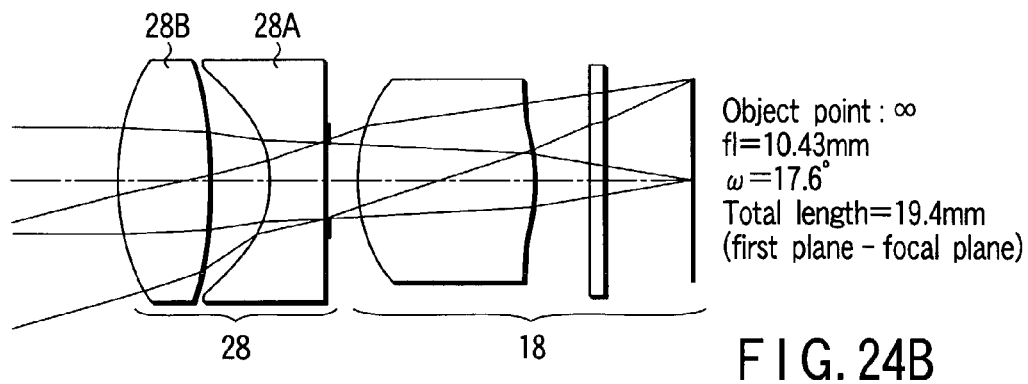
FIG. 24B is a schematic illustration of the synthetic optical effect of the image pickup module and the adapter optical system of the seventh embodiment, which is a cellular phone, when the embodiment is folded in a reversed condition.
Figure 24C:
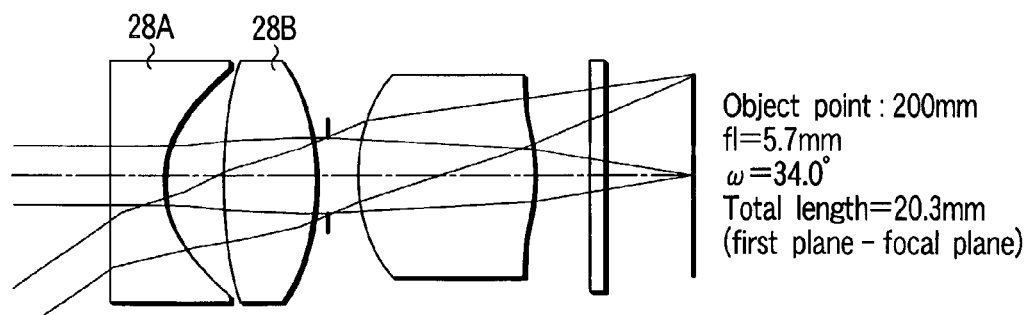
FIG. 24C is a schematic illustration of the synthetic optical effect of the image pickup module and the adapter optical system of the seventh embodiment, which is a cellular phone, when the embodiment is folded in an unreversed condition.

When the lid member 12 is turned by 180° and folded in a reversed condition as shown in FIGS. 21E and 22B, the adapter optical system 28 comprising the lenses 28A and 28B is inserted between the object to be shot and the image pickup module 18, as shown in FIG. 24B. More specifically, the lens 28A of the adapter optical system 28 is arranged at the side of the object to be shot and the lens 28B of the adapter optical system 28 is arranged at the side of the image pickup module 18. Then, the optical system produced by the combination shows optical parameters including an unchanged object distance of $\infty$ as in the case of the image pickup module 18 shown in FIG. 24A, a focal length fl of 10.43 mm and a view angle $\omega$ of 17.6° (the total length being now 19.4 mm). In short, the magnification of the image pickup module 18 can be changed by combining it with the adapter optical system 28.

With the above described optical parameters, the image pick up module 18 now can take a large image of an object located far away if compared with the module 18 used alone for shooting an object. In other words, the image pickup module 18 is now adapted to take a snap shot of a scene or a person separated from the module 18 by several meters, although the scene or the person may be too small if it is shot by the image pickup module 18 alone.

On the other hand, when the lid member 12 is folded in an unreversed condition as shown in FIGS. 21B and 22A, the lenses 28A, 28B of the adapter optical system 28 are located at the side of the object to the shot. More specifically, the lens 28A is located at the side of the object to be shot and the lens 28B is located at the side of the image pickup module 18 as opposed to the arrangement of the lenses 28A, 28B when the lid member 12 is folded in a reversed condition. Then, the optical system produced by the combination shows optical parameters including an object distance of 200 mm, a focal length fl of 5.7 mm and a view angle ω of 34.0°. The total length is now 20.3 mm.

These optical parameters are suited for macrophotography which a near object is shot as a relatively large image.

Thus, when the cellular phone is folded, the adapter optical system 28 arranged at the lid member 12 is located in front of the image pickup module 18 arranged at the oppositely disposed case 10 and the optical axis of the adapter optical system 28 substantially agrees with that of the image pickup module 18. Then, the directions of rays of light striking the image pickup module 18 are changed by the adapter optical system 28 in such a way that the synthetic optical system by the adapter optical system 28 and the image pickup module 18 shows optical parameters good for imaging a far point with a large magnification when folded in a reversed condition, whereas it shows optical parameters good for imaging a near point when folded in an unreversed condition.

The object distance of the synthetic optical system is equal to when the lid member 12 is folded in an unreversed condition and equal to 200 mm when the lid member 12 is folded in a reversed condition in the above description. However, it is also possible to make the adapter optical system 28 show such optical parameters of the synthetic optical system that the object distance thereof is equal to ∞ when the lid member 12 is folded in an unreversed condition and equal to 20 mm when the lid member 12 is folded in a reversed condition so that the image pickup module 18 may be suited for shooting an object at a nearer point of the view of field.

Thus, the optical parameters can be modified in many different ways by folding the cellular phone and combining the image pickup module 18 and the adapter optical system 28. Then, the camera of the cellular phone can find various applications.

Figure 25:
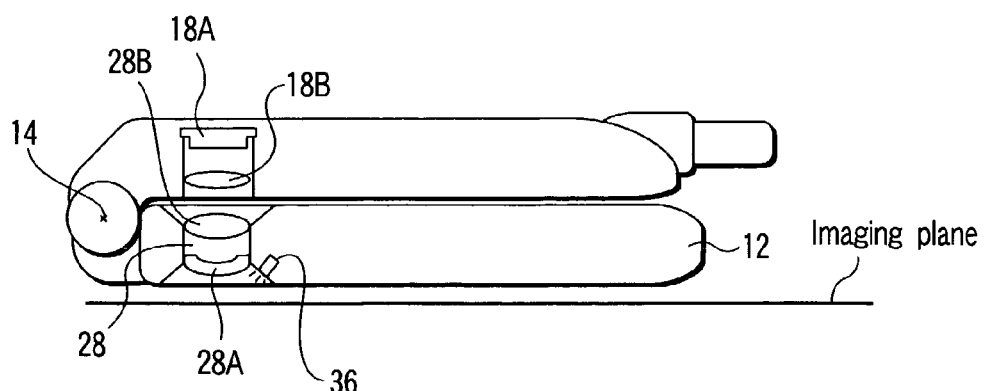
FIG. 25 is a schematic illustration of the lighting LED of the seventh embodiment, which is a cellular phone being used as optical mouse.

For example, when this embodiment of a cellular phone is to be used as an optical mouse, it is provided with a push button, or a mouse button 34, arranged at a lateral side of the case 10, as in the first embodiment, and also with a lighting LED 36 arranged at the image shooting side of the adapter optical system 28 of the lid member 12 as shown in FIG. 25. Note that, in FIG. 25, while the image pickup module 18, the adapter optical system 28 and the lighting LED 36 are supposed to be drawn by broken lines as in FIG. 1B, they are drawn by solid lines in order to clearly illustrate their positional relationship.

Figure 26:
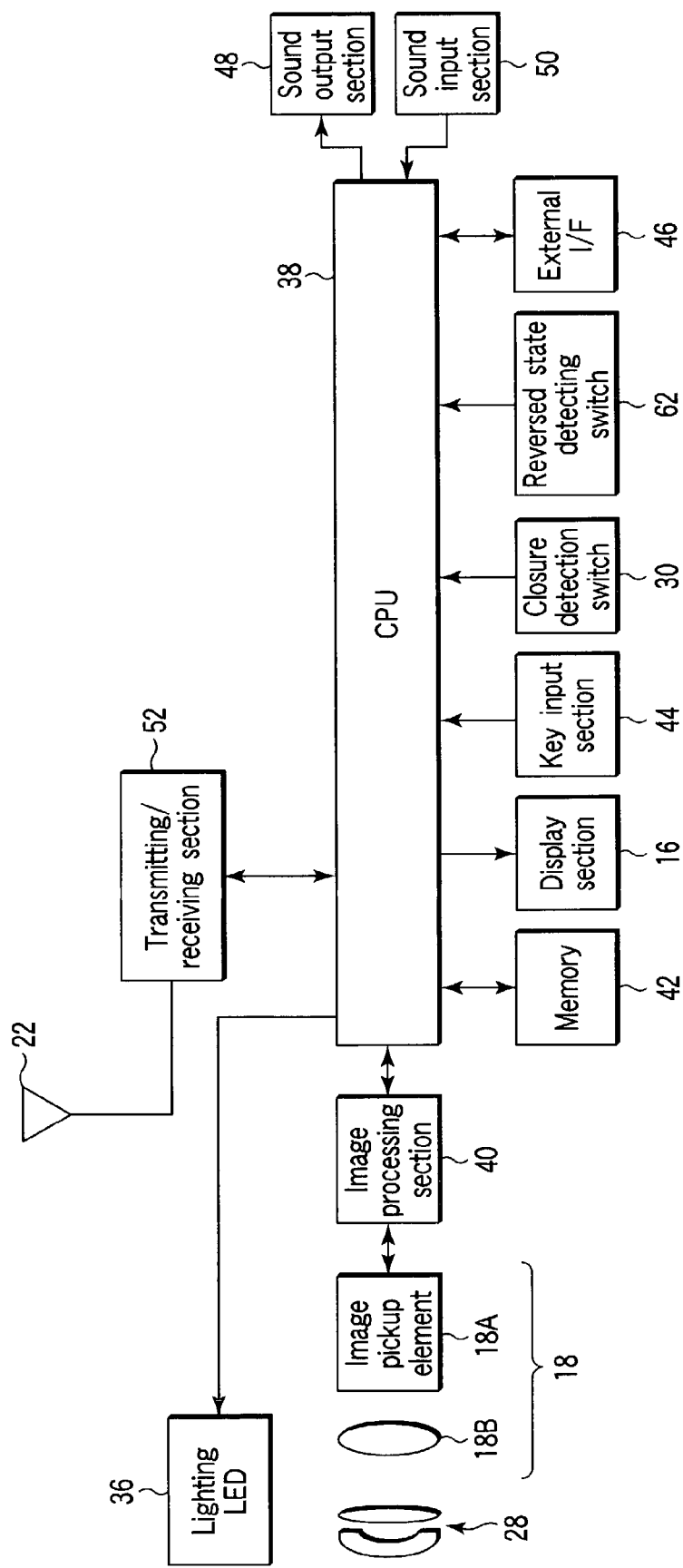
FIG. 26 is a schematic block diagram of a cellular phone operating as optical mouse.

FIG. 26 is a schematic block diagram of this embodiment of a cellular phone that is adapted to operate also as an optical mouse.

Namely, the embodiment comprises a reversed condition detecting switch 62 for detecting a reversed condition of the lid member 12 in addition to the configuration of the first embodiment of a cellular phone. The reversed condition detecting switch 62 is connected to the CPU 38 and typically arranged near the rotary shaft 60 that is used when the lid member 12 is rotated, whereas the closure detection switch 30 is arranged near the rotary shaft 14 that is used when the case 10 and the lid member 12 are folded relative to each other. The reversed condition detecting switch 62 may be a known mechanical switch that is turned on when the lid member 12 is rotated by a predetermined angle in an operation of rotating the lid member 12 (to make the optical axis of the lens 18B substantially agree with that of the adapter optical system 28).

Now, the operation of the CPU 38 of the cellular is phone having the above described configuration will be described by referring to the flow chart of FIG. 27.

Firstly, as the power switch of the cellular phone is turned on, the CPU 38 performs an ordinary processing operation necessary for the telephone such as for waiting or talking (Step S10). In other words, since the power switch is normally arranged as one of the operation keys 24 of the lid member 12, the cellular phone needs to be unfolded if the user wants to turn on the power switch. It does not operate as an optical mouse as a matter of course because the optical mouse operates only when the cellular phone is folded and completely closed. Therefore, the CPU 38 operates as an ordinary telephone operation, as described above, and the operation of the lighting LED 36 and that of the external I/F 46 are suspended along with the function of the 1 frame delay circuit and that of the inter-frame motion vector detecting circuit of the image processing section 40.

Thereafter, the CPU 38 determines if a command for starting an imaging operation is given or not (Step S40). Although a command for starting an imaging operation is given by way of selection from a menu, using a predetermined one of the operation keys 24, a dedicated key may be provided instead. If no command for starting an imaging operation is given, the CPU 38 returns to Step S10 and performs the processing operation for the ordinary telephone function.

If, on the other hand, a command for starting an imaging operation is given, the CPU 38 causes the image pickup element 18A and the image processing section 40 to start operating in the first imaging mode, which is the far point imaging operation mode (ordinary mode) for imaging an object at a far point in the field of view so that the cellular phone starts operating as an ordinary camera (Step S42). In this operation mode, the cellular phone operates as an ordinary camera for taking snap shots or as a video phone.

Then, the CPU 38 determines if the cellular phone is folded or not, referring to the condition of the closure detection switch 30 (Step S16). If it is determined that the cellular phone is not folded, the CPU 38 further determines if a command for stopping the imaging operation is given or not (Step S44). If it is determined that a command for stopping the imaging operation is given, the CPU 38 stops the operation of the image pickup element 18A and that of the image processing section 40 and returns to Step S10 and resumes the processing operation for the ordinary telephone function. If, on the other hand, it is determined that a command for stopping the imaging operation is not given, the CPU 38 returns to Step S42 and continues to operate as an ordinary camera. A command for stopping an imaging operation is given by way of selection from a menu, using a predetermined one of the operation keys 24, or by way of a dedicated key as in the case of a command for starting an imaging operation.

On the other hand, if it is determined that the cellular phone is folded in Step S16, the CPU 38 further determines if the lid member 12 of the cellular phone is reversed or not on the basis of the status of the reversed condition detecting switch 62 (Step S46). If it is determined that the lid member 12 is reversed, the CPU 38 proceeds to Step S44 as in the case of an unfolded lid member and determines if there is a command for stopping the imaging operation or not. If it is determined that there is no command for stopping the imaging operation, the CPU 38 returns to Step S42 and continues the operation of an ordinary camera. Note, however, that the synthesized optical system formed by the image pickup module 18 and the adapter optical system 28 has a object distance of ∞, which is the same as that of the image pickup module 18 alone, but shows a larger magnification. In other words, the camera operate in the third imaging mode, which is a far point imaging operation mode (telescope mode) and different from the operation mode of ordinary camera operations.

If, on the other hand, it is determined in Step S46 that the lid member 12 is not reversed, the CPU 38 makes the cellular phone operate as an optical mouse that utilizes the synthetic optical effect of the image pickup module 18 as combined with the adapter optical system 28 and adapted to image an object at a near point (Step S20). Thus, the CPU 38 brings the cellular phone into the second imaging mode, which is the near point imaging operation mode (positional information detection mode). More specifically, the CPU 38 suspends the operations of the display section 16, the sound output section 48, the sound input section 50 and the transmitting/receiving section 52 and makes the lighting LED 36 and the external I/F 46 start operating as well as the function of the 1 frame delay circuit and that of the inter-frame motion vector detecting circuit of the image processing section 40 in order to cause the image pickup element 18A to operate at a high frame rate. As a result, the cellular phone operates as an optical mouse.

Thereafter, the CPU 38 determines if the cellular phone is opened or not on the basis of the status of the closure detection switch 30 (Step S22) and returns to Step S20 to keep the optical mouse functioning so long as the cellular phone remains in the folded state. However, once the cellular phone is opened, the CPU 38 returns to Step S10 and performs a processing operation for the ordinary telephone function.

Thus, the seventh embodiment of a foldable cellular phone having a camera feature can be used as a wireless optical mouse by utilizing the adapter optical system 28 arranged at the lid member 12. Additionally, it can be made to have a number of sets of optical parameters when it is made to operate as an ordinary camera.

As in the case of the first embodiment, the function of the 1 frame delay circuit 106 and that of the inter-frame motion vector detecting circuit 108 of the optical mouse may be realized by using the CPU 38 and the memory 42 instead of arranging the circuit in the image processing section 40.

It is also possible to arrange the image pickup module 18 at a member carrying the operation keys 24 and the adapter optical system 28 at another member carrying the display section 16. If such is the case, the member carrying the operation keys 24 and the image pickup module 18 operates as the case and the member carrying the adapter optical system 28 and the display section 16 operates as the lid member. With this arrangement, the side carrying the display section 16 of the lid member is exposed to the outside when the lid member is reversed to make the cellular phone operate in the third imaging mode, which is the far point imaging operation mode (telescope mode) so that the display section 16 may be used as a view finder.

8th EMBODIMENT

Now, the eighth embodiment of the invention will be described below.

This embodiment is adapted to operate as a code reading apparatus in the second imaging mode, which is the near point imaging operation mode. More specifically, the adapter optical system 28 is used to allow the camera to shoot an object at a near point when the lid member is folded in an unreversed condition. The embodiment operates like the seventh embodiment when the lid member is not folded and when it is reversed and folded, and like the second embodiment when the lid member is unreversed and folded to make it operate as a code reading apparatus. Therefore, this embodiment will not be described any further in these respects.

When the lid member of the eighth embodiment is unreversed, folded and hence adapted to pick up an image of an object at a near point, the cellular phone can be used as a code reading apparatus, in which the image pickup module 18, the adapter optical system 28 and the lighting LED 36 are made to operate as image pickup section 218 of the code reading apparatus and the image processing section 40 is made to operate as binarizing section 220 of the code reading apparatus, while the CPU 38 is made to operate as the marker detecting section 222, the pattern dot detecting section 224, the dot reading point detecting section 226, the dot reading section 228 and the de-interleaving and error correcting processing section 232 of the code reading apparatus and the memory 42 and the sound output section 48 operate respectively as the memory 203 and the sound reproducing section 234 of the code reading apparatus. Preferably, the embodiment is provided with a scan start button, which may be like the above described mouse button 34, so that the image pickup module 18 does not continue its imaging operation as long as the lid member is folded but picks up an image (of a code) only when the scan start button is depressed.

Like the second embodiment, this embodiment may be so designed as to transmit the reproduced sound data and other data to an external electronic device 112 by way of the external I/F 46. Furthermore, when image data and/or text data is recorded as a dot code 200, the reproduced image data and/or the text data are stored in the memory 42 and displayed on the display section 16 when the cellular phone is opened. It may alternatively be so arranged that the reproduced data is transmitted to an external electronic device 112 by way of the external I/F 46. Furthermore, this embodiment can operate just like the second embodiment depending on the data recorded as a dot code 200.

It may be needless to mention that this embodiment of a portable information terminal device having a camera feature can operate as a code reading apparatus for reading an optically readable code other than a dot code 200. When reading a one-dimensional bar code that extends beyond the field of view, the memory 42 stores a plurality of images of the bar code and the device can restore the large original bar code by combining the stored images. It is also possible to arrange the embodiment in such a way that rays of light from the lighting LED 36 are converged into a beam and projected so that the device may operate like a so-called pen-type bar code reader and read the bar code.

9th EMBODIMENT

Now, the ninth embodiment of the invention will be described below.

The above described third embodiment is adapted to detect a fingerprint of and identify the user by the adapter optical system 28 that can pick up an image of an object located at a near point when the cellular phone is folded. The ninth embodiment is adapted to do so by the adapter optical system 28 that can pick up an image of an object located at a near point when the cellular phone is unreversed and folded.

Figure 28:
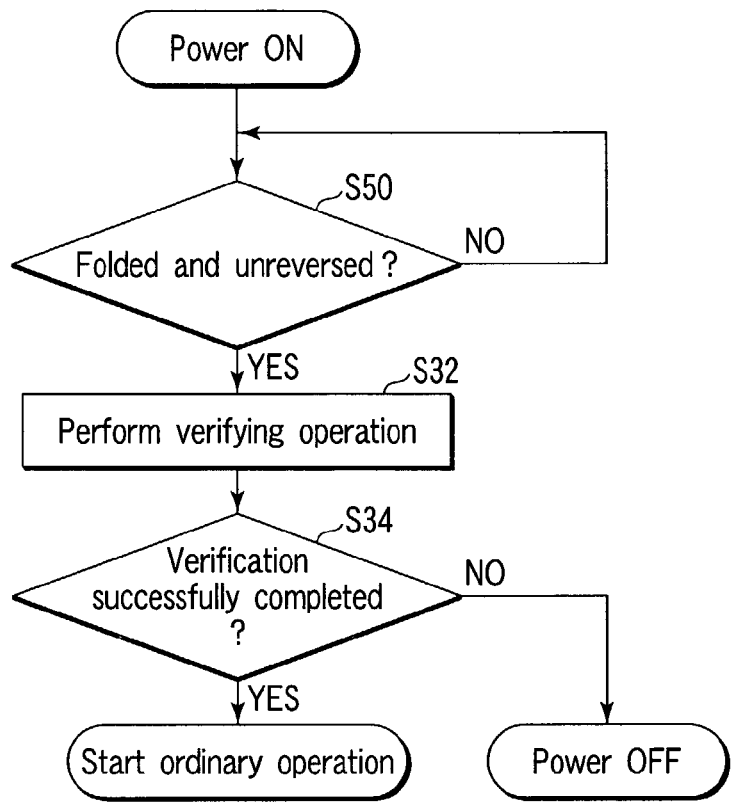
FIG. 28 is a flow chart of the operation of the ninth embodiment of portable information terminal device having a camera feature of the present invention, which is a foldable cellular phone.

Referring to the flow chart of FIG. 28, as the power switch of the cellular phone is turned on, the CPU 38 determines the current status of the closure detection switch 30 and that of the reversed condition detecting switch 62 and waits until the cellular phone is folded in an unreversed condition (Step S50). In other words, if the cellular phone is unfolded and the power supply key, which is one of the operation keys 24, is turned on, the cellular phone is still not ready for operation.

As the cellular phone is folded in an unreversed condition, the image pickup module 18, which is now combined with the adapter optical system 28 so as to be able to pick up an image of an object located at a near point, picks up an image of a fingerprint of and identifies the user (Step S32).

Then, the CPU 38 determines whether the operation of identifying the user has successfully completed or not (Step S34) and starts a normal operation for making the cellular phone ready for use only when the identifying operation has successfully completed. In other words, the power switch is turned off when the identifying operation has not been completed successfully.

10th EMBODIMENT

Now, the tenth embodiment of the invention will be described below.

Figure 29A:
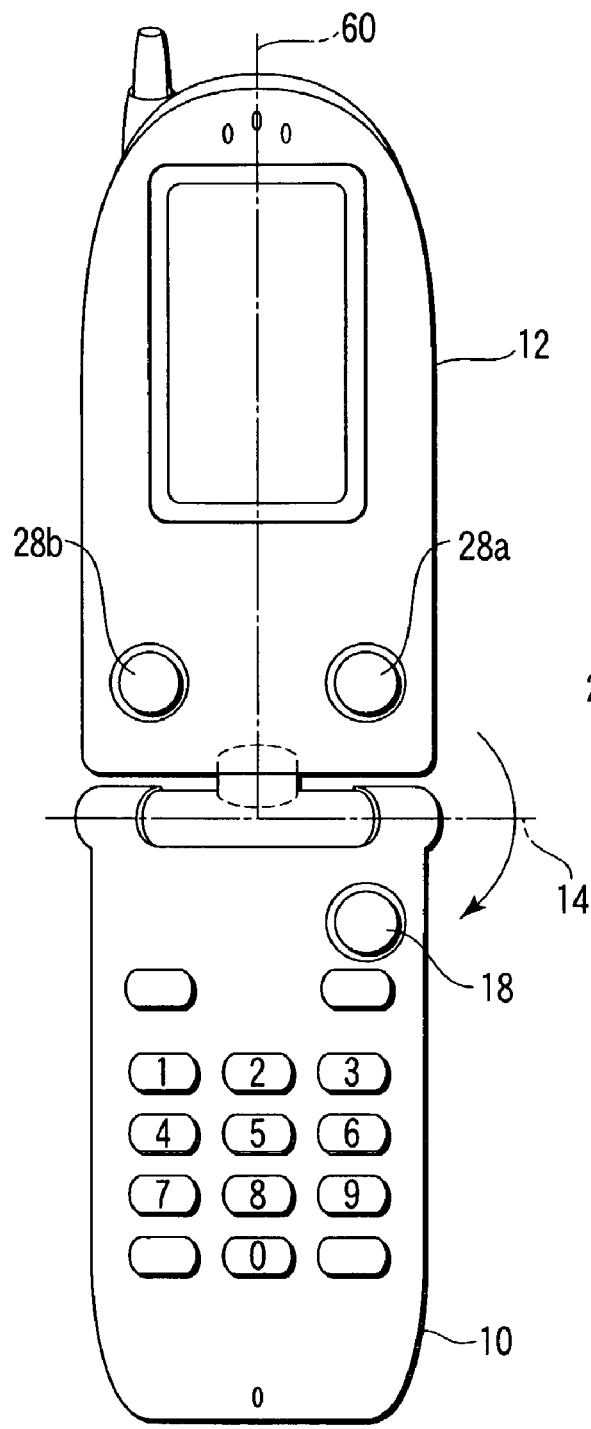
FIGS. 29A and 29B are schematic plan views of the tenth embodiment of portable information terminal device having a camera feature of the present invention, which is a foldable cellular phone.
Figure 29B:
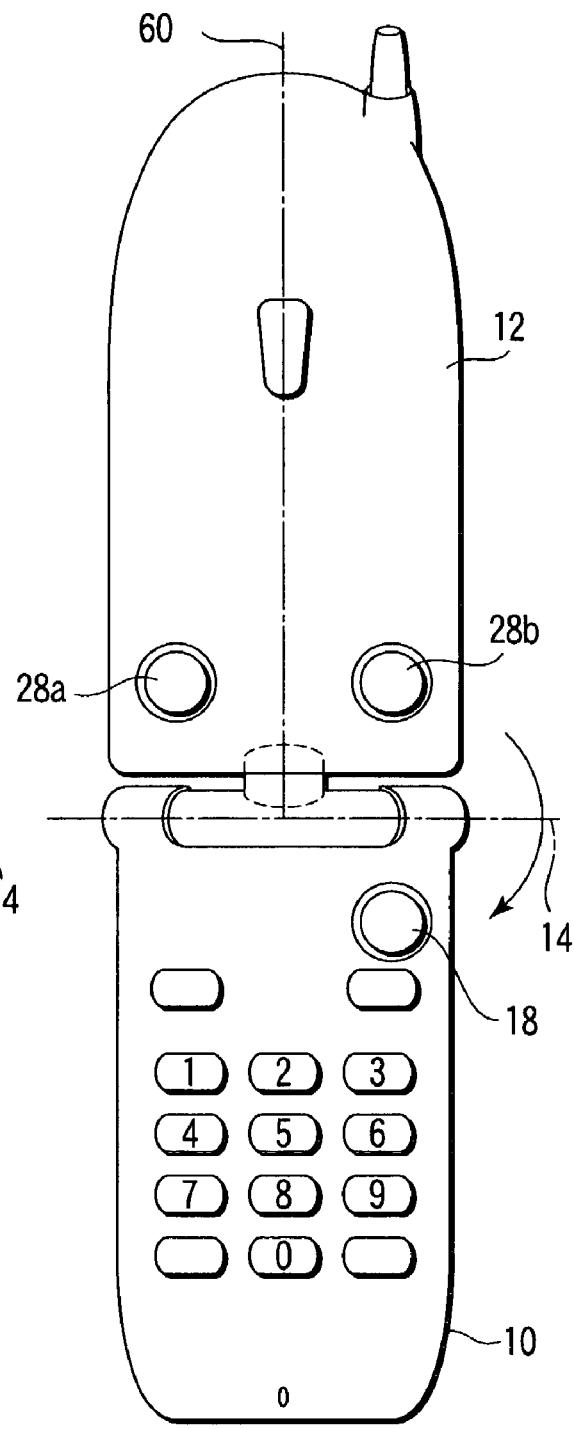

As shown in FIGS. 29A and 29B, a plurality of adapter optical systems 28a, 28b may be fitted to the lid member 12.

More specifically, the image pickup module 18 is fitted to the case 10 at a position separated by a predetermined distance from the axis obtained by projecting the rotary shaft 60 of the lid member 12 on the case 10, whereas the adapter optical systems 28a, 28b of the lid member 12 are fitted to respective positions that are separated from the rotary shaft 60 by a predetermined distance, and are symmetrical relative to the rotary shaft 60.

Thus, when the lid member 12 is folded in an unreversed condition from the unfolded state shown in FIG. 29A, the optical axis of the adapter optical system 28a agrees with that of the image pickup module 18. Therefore, light striking the rear surface of the lid member 12 is transmitted through the adapter optical system 28a and enters the image pickup module 18 arranged at the side of the case 10. When, on the other hand, the lid member 12 is folded in a reversed condition from the reversed and unfolded state shown in FIG. 29B, the optical axis of the adapter optical system 28b agrees with that of the image pickup module 18. Therefore, light striking the front surface of the lid member 12 is transmitted through the adapter optical system 28b and enters the image pickup module 18 arranged at the side of the case 10.

If the adapter optical systems 28a and 28b are made to show respective sets of optical parameters that are different from each other, the embodiment can be made to operate with differentiated optical parameters that are interlocked with the folding motion and the rotary motion of the lid member.

Now, examples of adapter optical system that can be used for the adapter optical system 28a or 28b will be discussed below.

Figure 30:
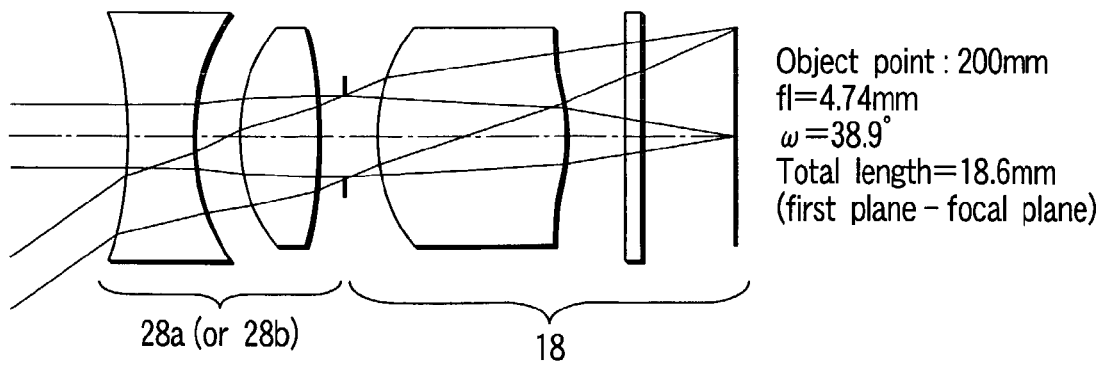
FIG. 30 is a schematic illustration of the synthetic optical effect of the image pickup module and the adapter optical system of the tenth embodiment, which is a cellular phone, when the embodiment is folded.

The adapter optical system illustrated in FIG. 30 shows optical parameters including an object distance of 200 mm, a focal length fl of 4.74 mm and a view angle ω of 38.9°. The total length is 18.6 mm. Such a lens may be used for picking up a detailed image of an object located relatively close to the lens.

The lens arrangement of the adapter optical system 28a or 28b may be modified to that of FIG. 24B. Then, the focal length fl and the view angle ω can be made respectively equal to 10.43 mm and 17.6°, keeping the object distance equal to ∞, the same as that of the image pickup module 18 of FIG. 24A (to make the total length equal to 19.4 mm). In other words, the magnification of the optical system can be modified.

It should be noted that the configuration of the adapter optical system 28a or 28b is not limited to those described above. It may alternatively comprise a mirror or an optical prism 28C as shown in FIG. 5 that does not have any power but is simply adapted to bend the optical path by 90°. With an adapter optical system 28 having such a configuration, the embodiment can be used as a video phone that picks up an image of the user by means of the image pickup module 18 when the cellular phone is held open or shoots the background of the user by bending the optical path by means of the adapter optical system when the cellular phone is folded and then transmits the picked up image to the other end of the line.

While not specifically illustrated in the drawing, the adapter optical system 28a or 28b may comprise an optical filter such as an infrared cut filter. Alternatively, the adapter optical system 28a or 28b may comprise an aperture. Then, the F number can be raised to increase the depth of field by reducing the aperture diameter.

Thus, as two adapter optical systems 28a, 28b having different sets of optical parameters are adopted, it is possible to selectively use either of them depending on the objective of the use of the camera by a simple operation of unfolding or folding and/or rotating the lid member 12 of the foldable cellular phone having a camera feature.

Additionally, each of the adapter optical systems can be designed simply by considering the optical parameters that are effective for light coming in only from one direction. Therefore, the adapter optical systems can be designed without difficulty so as to show respective sets of optical parameters that are greatly different from each other.

Furthermore, the two adapter optical systems 28a, 28b can be realized by combining a filter and an optical prism that are optically quite different from each other so as to make them show respective sets of optical parameters that are very different form each other.

11th EMBODIMENT

Now, the eleventh embodiment of the invention will be described below.

Figure 31A:
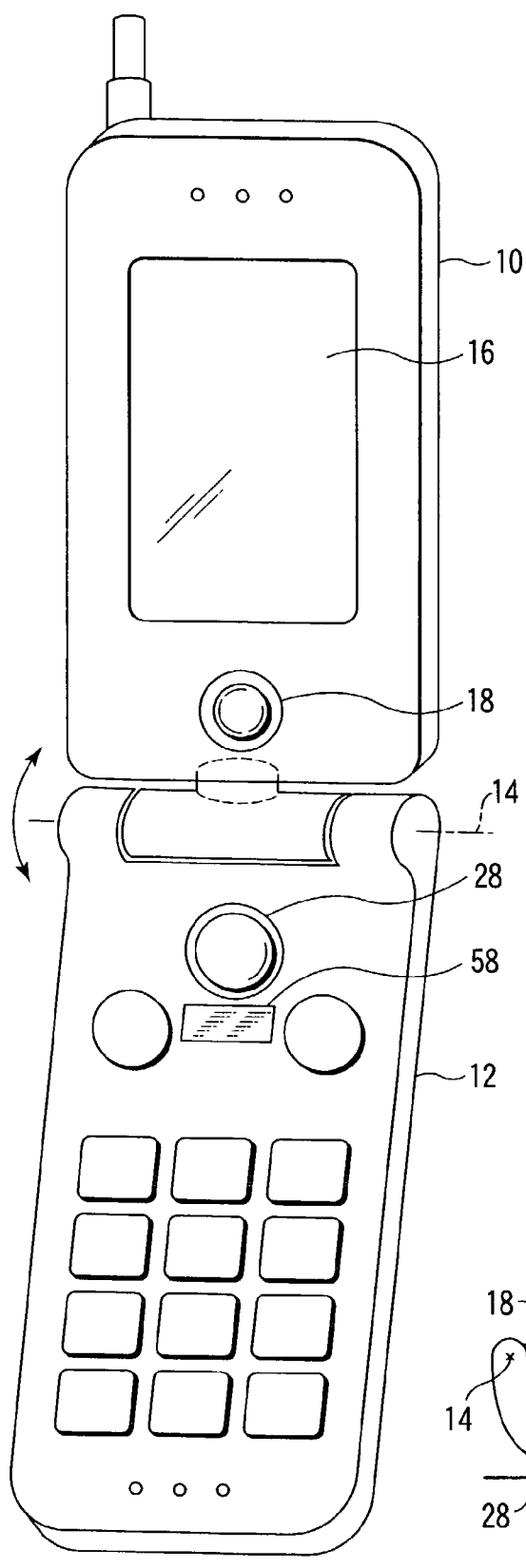
FIG. 31A is a schematic perspective view of the eleventh embodiment of portable information terminal device having a camera feature of the present invention, which is a foldable cellular phone.
Figure 31B:
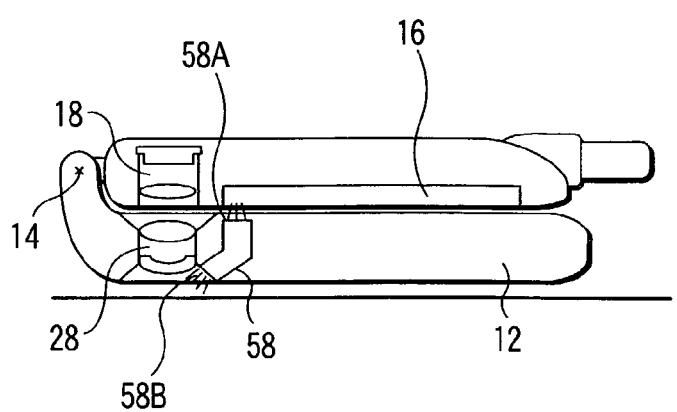
FIG. 31B is a schematic illustration of the relationship of the light-conducting member, the display section and the adapter optical system of the eleventh embodiment, which is a cellular phone, shown in a folded condition.

As shown in FIGS. 31A and 31B, in this eleventh embodiment of cellular phone, the case 10 and the lid member 12 are linked to each other by way of rotary shafts 14 and 60 so as to make them rotatable (displaceable) in two directions relative to each other, like the above described sixth embodiment, although the lighting LED 36 of the sixth embodiment is omitted. The display section 16 comprises an LCD provided with a back light. The back light and light-conducting member 58 are used for lighting. Note that, in FIG. 31B, while the display section (LCD provided with a back light) 16, the image pickup module 18, the adapter optical system 28 and the light-conducting member 58 are supposed to be drawn by broken lines, they are drawn by solid lines in order to clearly illustrate their positional relationship.

With the above described configuration, while the near shooting area that is shot when the cellular phone is folded requires illumination because it is shadowed by the cellular phone main body and not illuminated by light from the surrounding area, the back light of the LCD of the display section 16 is utilized for illumination so that it is not necessary to provide a dedicated lighting device for lighting the near shooting area.

The present invention is described above in detail by referring to preferred embodiments. However, the present invention is by no means limited to the above described embodiments, which may be modified in various ways without departing from the scope of the invention.

The present invention is summarized below.

(1) A portable information terminal device having a camera feature and comprising:

a case provided with a first optical system and an image pickup element which receives light from an object point focused by the first optical system and outputs a corresponding image signal; and a lid member of the device provided at a predetermined position with a second optical system different from the first optical system, wherein the lid member is linked to the case so as to make itself displaceable relative to the case between predetermined positions including a position for causing an optical axis of the first optical system and that of the second optical system to substantially agree with each other; and optical parameters of a synthetic optical system obtained by combining the first optical system and the second optical system at a position for causing the optical axis of the first optical system and that of the second optical system to substantially agree with each other as reached by displacing the case and the lid member relative to each other is different from those of the first optical system.

With the above arrangement, the optical parameters of the entire system are changed by the adapter optical system as the second optical system arranged at the lid member so that the operation of moving the lid member and that of changing the optical parameters can be easily interlocked.

(2) The portable information terminal device having a camera feature according to (1), wherein the lid member is linked to the case so as to be displaceable relative to the case between a position for causing the optical axis of the first optical system and that of the second optical system to substantially agree with each other and a position for causing the optical axes not to agree with each other.

With this arrangement, the optical axis of the adapter optical system that is the second optical system can be easily made to agree with the optical axis of the first optical system.

(3) The portable information terminal device having a camera feature according to (2), wherein the position where the optical axis of the first optical system substantially agree with that of the second optical system is the position where the lid member is closed onto the case.

With this arrangement, the adapter optical system that is the second optical system can be brought into operation by a relative motion of closing the lid member and the lid member can operate as protection cover for the first optical system.

(4) The portable information terminal device having a camera feature according to one of (1) to (3), wherein the optical parameters include a parameter relating to the position of the focused object point.

With this arrangement, the camera may be modified from the direct view type to the side view type by moving the lid member relative to the case and the position of the focused object point can be shifted.

(5) The portable information terminal device having a camera feature according to one of (1) to (4), wherein the optical parameters include at least one of magnification and view angle.

With this arrangement, a so-called tele-converter and a wide-converter can be realized so that the optical magnification can be modified by moving the lid member relative to the case.

(6) The portable information terminal device having a camera feature according to one of (1) to (5), wherein the case and the lid member are linked to each other by way of a rotary shaft so as to be rotatable in a predetermined direction.

With this arrangement, the case and the lid member can be displaced relative to each other by using a simple means so as to cause the optical axis of the first optical system and that of the second optical system to substantially agree with each other.

(7) The portable information terminal device having a camera feature according to one of (1) to (5), wherein the case and the lid member are linked to each other by way of a sliding engaging section so as to be able to slide in a predetermined direction.

With this arrangement, the case and the lid member can be displaced relative to each other by using a simple means so as to cause the optical axis of the first optical system and that of the second optical system to substantially agree with each other.

(8) The portable information terminal device having a camera feature according to one of (1) to (7), further comprising:

a control section which detects one of a substantial agreement of the optical axis of the first optical system and that of the second optical system and a motion of causing the optical axis of the first optical system and that of the second optical system to substantially agree with each other and selects a second imaging mode suited for an image pickup operation using the synthetic optical system and different from a first imaging mode suited for an image pickup operation using only the first optical system.

With this arrangement, the operation mode of the camera can be switched automatically by a relative movement of the case and the lid member. Therefore, for instance, a camera operation mode like that of a so-called video phone in which the lid member is open and the user of the cellular phone can pick up an image of his- or herself and transmits it to the other end of the line while talking by way of the cellular phone can be switched to an operation mode of an ordinary camera in which the lid member is closed and the camera can be used to pick up an image of the surrounding environment or an operation mode for a near point imaging operation, or vice versa.

(9) The portable information terminal device having a camera feature according to (8), wherein the first imaging mode is suited to pick up an image of an object point at a far point in a field of view of the camera, and the second imaging mode is suited to pick up an image of an object point at a near point in the field of view.

With this arrangement, the device has a near point camera mode so that the camera can be used to pick up an image of a fingerprint or the face of the operator to identify the operator when the power switch is turned on for starting an operation of the device. Then, the device can be opened for use only when the operator is verified.

(10) The portable information terminal device having a camera feature according to (9), wherein the second imaging mode includes a positional information detection mode for obtaining information on a current relative position of itself by detecting direction and distance of relative movement of itself from the images of the object picked up at different moments.

With this arrangement, the information terminal device can detect a motion and determine the vector of the motion so that it can be used as an input device or a pointing device of a PDA.

(11) The portable information terminal device having a camera feature according to (10), further comprising:

an external interface which outputs the information on the relative position of itself as obtained in the positional information detection mode to an external device.

With this arrangement, the information terminal device can be used as a mouse of a PC.

(12) The portable information terminal device having a camera feature according to (9), wherein the second imaging mode includes a code reading mode for picking up an image of an optically readable code recorded on a recording medium and representing data and for reproducing the data.

With this arrangement, the information terminal device can be used as reading apparatus for reading bar codes and dot codes.

(13) The portable information terminal device having a camera feature according to (9), wherein a lighting section is provided at the lid member for lighting an object point at a near point in the field of view in the second imaging mode.

With this arrangement, an image of the object point can be picked up in a good condition by utilizing the lighting section when the object point is shaded by the device and can hardly be illuminated by external light.

(14) The portable information terminal device having a camera feature according to (13), wherein a display section which displays information is further provided at least one of at the case and at the lid member; and the lighting section includes a light-conducting member which conducts light used in the display section to the object at a near point in the field of view.

With this arrangement, light of the display section that may be the back light of an LCD can be utilized for lighting.

(15) A portable information terminal device having a camera feature and comprising:

a case provided with a first optical system and an image pickup element which receives light from an object point located at a far point of a field of view and focused by the first optical system and outputs a corresponding image signal; and a lid member of the device provided at a predetermined position with a second optical system different from the first optical system, wherein the lid member is linked to the case so as to be displaceable relative to the case between predetermined positions including a position for causing an optical axis of the first optical system and that of the second optical system to substantially agree with each other;

optical parameters of a synthetic optical system obtained by combining the first optical system and the second optical system at a position for causing the optical axis of the first optical system and that of the second optical system to substantially agree with each other as reached by displacing the case and the lid member relative to each other is suited for focusing light from an object point at a near point in the field of view; and a lighting section which illuminates the object point at the near point is provided at the lid member.

With this arrangement, the adapter optical system arranged at the lid member can be removed or put back as the case and the lid member are moved relative to each other and optical parameters suited for picking up an image of an object point at a near point in the field of view can be obtained with ease by using the adapter optical system. Additionally, the object point can be illuminated when it is located very close. Therefore, it is no longer necessary to worry about shadowing the object point by the camera main body if the object to be shot comes very close to the camera.

(16) The portable information terminal device having a camera feature according to (15), wherein the lighting section is arranged close to the second optical system provided at the lid member.

With this arrangement, the distance between the object to be shot and the lighting section can also be reduced to enhance the lighting effect when the object is located very close.

(17) The portable information terminal device having a camera feature according to one of (15) and (16), wherein the lid member is linked to the case so as to be displaceable relative to the case between a position for causing the optical axis of the first optical system and that of the second optical system to substantially agree with each other and a position for causing the optical axes not to agree with each other.

With this arrangement, the optical axis of the second optical system can be easily made to agree with the optical axis of the first optical system.

(18) The portable information terminal device having a camera feature according to (17), wherein the position where the optical axis of the first optical system substantially agree with that of the second optical system is the position where the lid member is closed onto the case.

With this arrangement, the adapter optical system can be brought into operation by a relative motion of closing the lid member and the lid member can operate as protection cover for the first optical system.

(19) The portable information terminal device having a camera feature according to one of (15) to (18), wherein a display section which displays information is further provided at least one of at the case and at the lid member; and the lighting section includes a light-conducting member which conducts light used in the display section to the object at a near point in the field of view.

With this arrangement, light of the display section that may be the back light of an LCD can be utilized for lighting.

(20) The portable information terminal device having a camera feature according to one of (15) to (19), wherein the case and the lid member are linked to each other by way of a rotary shaft so as to be rotatable in a predetermined direction.

With this arrangement, the case and the lid member can be displaced relative to each other by using a simple means so as to cause the optical axis of the first optical system and that of the second optical system to substantially agree with each other.

(21) The portable information terminal device having a camera feature according to one of (15) to (19), wherein the case and the lid member are linked to each other by way of a sliding engaging section so as to be able to slide in a predetermined direction.

With this arrangement, the case and the lid member can be displaced relative to each other by using a simple means so as to cause the optical axis of the first optical system and that of the second optical system to substantially agree with each other.

(22) The portable information terminal device having a camera feature according to one of (15) to (21), further comprising:

a control section which detects one of a substantial agreement of the optical axis of the first optical system and that of the second optical system and a motion of causing the optical axis of the first optical system and that of the second optical system to substantially agree with each other and selects a second imaging mode suited for an operation of picking up an image of an object point at a near point in the field of view, using the synthetic optical system, and different from a first imaging mode suited for an operation of picking up an image of an object point at a far point in the field of view, using only the first optical system.

With this arrangement, since the operation mode of the camera can be switched automatically by a relative movement of the case and the lid member. Therefore, for instance, a camera operation mode like that of a so-called video phone in which the lid member is open and the user of the cellular phone can pick up an image of his- or herself and transmits it to the other end of the line while talking by way of the cellular phone can be switched to an operation mode of an ordinary camera in which the lid member is closed and the camera can be used to pick up an image of the surrounding environment or vice versa.

(23) The portable information terminal device having a camera feature according to (22), wherein the second imaging mode includes a positional information detection mode for obtaining information on a current relative position of itself by detecting the direction and distance of relative movement of itself from the images of the object picked up at different moments.

With this arrangement, the information terminal device can detect a motion and determine the vector of the motion so that it can be used as an input device or a pointing device of a PDA.

(24) The portable information terminal device having a camera feature according to (23), further comprising:

an external interface which outputs the information on the relative position of itself as obtained in the positional information detection mode to an external device.

With this arrangement, the information terminal device can be used as a mouse of a PC and the like.

(25) The portable information terminal device having a camera feature according to (22), wherein the second imaging mode includes a code reading mode for picking up an image of an optically readable code recorded on a recording medium and representing data and for reproducing the data.

With this arrangement, the information terminal device can be used as code reading apparatus for reading bar codes and dot codes.

(26) A portable information terminal device having a camera feature and comprising:

a case provided with a first optical system and an image pickup element which receives light from an object point focused by the first optical system and outputs a corresponding image signal; and a lid member of the device provided at a predetermined position with a second optical system different from the first optical system, wherein the lid member is linked to the case so as to make itself displaceable relative to the case and able to take a first state of an optical axis of the first optical system substantially agreeing with that of the second optical system and a second state of the second optical system of being reversed and of the optical axis of the first optical system substantially agreeing with that of the second optical system; and optical parameters of a synthetic optical system obtained by combining the first optical system and the second optical system in the first state of displacing the case and the lid member relative to each other, optical parameters of a synthetic optical system obtained by combing the first optical system and the second optical system in the second state of displacing the case and the lid member relative to each other and optical parameters of the first optical system are differentiated from each other.

With this arrangement, the optical performance of the entire system can be modified by the second optical system arranged at the lid member as a result of movement of the lid member so that an action of moving the lid member and that of changing the optical parameters can be interlocked. Furthermore, since the second optical system can be reversed for use, a single optical system can provide different sets of optical parameters.

(27) A portable information terminal device having a camera feature and comprising:

a case provided with a first optical system and an image pickup element which receives light from an object point focused by the first optical system and outputs a corresponding image signal; and a lid member of the device provided at predetermined respective positions with a second optical system different from the first optical system and a third optical system different from the first optical system and the second optical system, wherein the lid member are linked to the case so as to make itself displaceable relative to the case and able to take a first state of an optical axis of the first optical system substantially agreeing with that of the second optical system and a second state of the optical axis of the first optical system substantially agreeing with that of the third optical system; and optical parameters of a synthetic optical system obtained by combining the first optical system and the second optical system in the first state of displacing the case and the lid member relative to each other, optical parameters of a synthetic optical system obtained by combing the first optical system and the third optical system in the second state of displacing the case and the lid member relative to each other and optical parameters of the first optical system are differentiated from each other.

With this arrangement, the optical performance of the entire system can be modified by the second optical system and the third optical system arranged at the lid member as a result of movement of the lid member so that an action of moving the lid member and that of changing the optical parameters can be interlocked. Furthermore, since the second optical system and the third optical system can be designed simply by considering the optical parameters for incident light coming in a single direction, each of the optical systems can be designed simply and the sets of optical parameters can be made to vary to a large extent.

(28) The portable information terminal device having a camera feature according to one of (26) and (27), wherein the optical parameters include a parameter relating to the position of the focused object point.

With this arrangement, the camera may be modified from the direct view type to the side view type by moving the lid member relative to the case and the position of the focused object point can be shifted.

(29) The portable information terminal device having a camera feature according to one of (26) to (28), wherein the optical parameters include at least one of magnification and view angle.

With this arrangement, a so-called tele-converter and a wide-converter can be realized so that the optical magnification of the camera can be modified by moving the lid member relative to the case.

(30) The portable information terminal device having a camera feature according to one of (26), (28) and (29), further comprising:

a control section which detects either a substantial agreement of the optical axis of the first optical system and that of the second optical system and a reversed/unreversed condition of the second optical system or a motion of causing the optical axis of the first optical system and that of the second optical system to substantially agree with each other and also reversing/unreversing the second optical system and selects either a second imaging mode suited for an image pickup operation using a synthetic optical system formed by the first optical system and the second optical system and different from a first imaging mode suited for an image pickup operation using only the first optical system or a third imaging mode suited for an image pickup operation using a synthetic optical system formed by the first optical system and the second optical system, which is reversed, and different from the first imaging mode.

With this arrangement, the operation mode of the camera can be switched automatically by detecting the closed state or the open state and the reversed state as a function of the optical parameters of the synthetic optical systems.

(31) The portable information terminal device having a camera feature according to one of (27) to (29), further comprising:

a control section which detects one of either a substantial agreement of the optical axis of the first optical system and that of the second optical system or a substantial agreement of the optical axis of the first optical system and that of the third optical system and either a motion of causing the optical axis of the first optical system and that of the second optical system to substantially agree with each other or a motion of causing the optical axis of the first optical system and that of the third optical system to substantially agree with each other and selects either a second imaging mode suited for an image pickup operation using a synthetic optical system formed by the first optical system and the second optical system and different from a first imaging mode suited for an image pickup operation using only the first optical system or a third imaging mode suited for an image pickup operation using a synthetic optical system formed by the first optical system and the third optical system and different from the first imaging mode.

With this arrangement, the operation mode of the camera can be switched automatically by detecting the closed state or the open state and the reversed state of the optical system as a function of the optical parameters of the synthetic optical systems.

(32) The portable information terminal device having a camera feature according to one of (30) and (31), wherein the first imaging mode is suited to pick up an image of an object point at a far point in the field of view of the camera and at least one of the second imaging mode and the third imaging mode is suited to pick up an image of an object point at a near point in the field of view.

With this arrangement, the device operates as a near point camera in a state where the lid member is closed. Then, the camera can be used to pick up an image of a fingerprint or the face of the operator to identify the operator when the power switch is turned on for starting an operation of the device. Then, the device can be opened for use only when the operator is verified.

(33) The portable information terminal device having a camera feature according to (32), wherein the imaging mode suited for picking up an image of an object point at a near point in the field of view includes a positional information detection mode for obtaining information on a current relative position of itself by detecting direction and distance of relative movement of itself from the images of the object picked up at different moments.

With this arrangement, the information terminal device can detect a motion and determine the vector of the motion so that it can be used as an input device or a pointing device of a PDA.

(34) The portable information terminal device having a camera feature according to (33), further comprising:

an external interface which outputs the information on the relative position of itself as obtained in the positional information detection mode to an external device.

With this arrangement, the information terminal device can be used as a mouse of a PC and the like.

(35) The portable information terminal device having a camera feature according to (32), wherein the imaging mode suited for picking up an image of an object point at a near point in the field of view includes a code reading mode for picking up an image of an optically readable code recorded on a recording medium and representing data and for reproducing the data.

With this arrangement, the information terminal device can be used as reading apparatus for reading bar codes and dot codes.

(36) The portable information terminal device having a camera feature according to (32), wherein a lighting section is provided at the lid member for lighting an object point at a near point in the field of view in the imaging mode.

With this arrangement, an image of the object point can be picked up in a good condition by utilizing the lighting section when the object point is shaded by the device and can hardly be illuminated by external light.

(37) The portable information terminal device having a camera feature according to (36), wherein a display section which displays information is further provided at least one of at the case and at the lid member; and the lighting section includes a light-conducting member which conducts light used in the display section to the object at a near point in the field of view.

With this arrangement, light of the display section that may be the back light of an LCD can be utilized for lighting.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable information terminal device having a camera feature and comprising:
a case provided with a first optical system and an image pickup element which receives light from an object point focused by said first optical system and outputs a corresponding image signal; and
a lid member of the device provided at a predetermined position with a second optical system different from said first optical system, wherein
said lid member is linked to said case so as to make itself displaceable relative to said case between predetermined positions including a position for causing an optical axis of said first optical system and that of said second optical system to substantially agree with each other; and
optical parameters of a synthetic optical system obtained by combining said first optical system and said second optical system at a position for causing the optical axis of said first optical system and that of said second optical system to substantially agree with each other as reached by displacing said case and said lid member relative to each other is different from those of said first optical system.

2. The portable information terminal device having a camera feature according to claim 1, wherein
said lid member is linked to said case so as to be displaceable relative to said case between a position for causing the optical axis of said first optical system and that of said second optical system to substantially agree with each other and a position for causing the optical axes not to agree with each other.

3. The portable information terminal device having a camera feature according to claim 2, wherein
the position where the optical axis of said first optical system substantially agree with that of said second optical system is the position where said lid member is closed onto the case.

4. The portable information terminal device having a camera feature according to claim 1, wherein
the optical parameters include a parameter relating to the position of the focused object point.

5. The portable information terminal device having a camera feature according to claim 1, wherein
the optical parameters include at least one of magnification and view angle.

6. The portable information terminal device having a camera feature according to claim 1, wherein
said case and said lid member are linked to each other by way of a rotary shaft so as to be rotatable in a predetermined direction.

7. The portable information terminal device having a camera feature according to claim 1, wherein said case and said lid member are linked to each other by way of a sliding engaging section so as to be able to slide in a predetermined direction.

8. The portable information terminal device having a camera feature according to claim 1, further comprising:
a control section which detects one of a substantial agreement of the optical axis of said first optical system and that of said second optical system and a motion of causing the optical axis of said first optical system and that of said second optical system to substantially agree with each other and selects a second imaging mode suited for an image pickup operation using said synthetic optical system and different from a first imaging mode suited for an image pickup operation using only said first optical system.

9. The portable information terminal device having a camera feature according to claim 8, wherein
the first imaging mode is suited to pick up an image of an object point at a far point in a field of view of the camera, and
the second imaging mode is suited to pick up an image of an object point at a near point in the field of view.

10. The portable information terminal device having a camera feature according to claim 9, wherein
the second imaging mode includes a positional information detection mode for obtaining information on a current relative position of itself by detecting direction and distance of relative movement of itself from the images of the object picked up at different moments.

11. The portable information terminal device having a camera feature according to claim 10, further comprising:
an external interface which outputs the information on the relative position of itself as obtained in the positional information detection mode to an external device.

12. The portable information terminal device having a camera feature according to claim 9, wherein
the second imaging mode includes a code reading mode for picking up an image of an optically readable code recorded on a recording medium and representing data and for reproducing the data.

13. The portable information terminal device having a camera feature according to claim 9, wherein
a lighting section is provided at said lid member for lighting an object point at a near point in the field of view in said second imaging mode.

14. The portable information terminal device having a camera feature according to claim 13, wherein
a display section which displays information is further provided at least one of at said case and at said lid member; and
said lighting section includes a light-conducting member which conducts light used in said display section to the object at a near point in the field of view.

15. A portable information terminal device having a camera feature and comprising:
a case provided with a first optical system and an image pickup element which receives light from an object point located at a far point of a field of view and focused by said first optical system and outputs a corresponding image signal; and
a lid member of the device provided at a predetermined position with a second optical system different from said first optical system, wherein
said lid member is linked to said case so as to be displaceable relative to said case between predetermined positions including a position for causing an optical axis of said first optical system and that of said second optical system to substantially agree with each other;
optical parameters of a synthetic optical system obtained by combining said first optical system and said second optical system at a position for causing the optical axis of said first optical system and that of said second optical system to substantially agree with each other as reached by displacing said case and said lid member relative to each other is suited for focusing light from an object point at a near point in the field of view; and
a lighting section which illuminates said object point at the near point is provided at said lid member.

16. The portable information terminal device having a camera feature according to claim 15, wherein
said lighting section is arranged close to said second optical system provided at said lid member.

17. The portable information terminal device having a camera feature according to claim 15, wherein
said lid member is linked to said case so as to be displaceable relative to said case between a position for causing the optical axis of said first optical system and that of said second optical system to substantially agree with each other and a position for causing the optical axes not to agree with each other.

18. The portable information terminal device having a camera feature according to claim 17, wherein
the position where the optical axis of said first optical system substantially agree with that of said second optical system is the position where said lid member is closed onto the case.

19. The portable information terminal device having a camera feature according to claim 15, wherein
a display section which displays information is further provided at least one of at said case and at said lid member; and
said lighting section includes a light-conducting member which conducts light used in said display section to said object at a near point in the field of view.

20. The portable information terminal device having a camera feature according to claim 15, wherein
said case and said lid member are linked to each other by way of a rotary shaft so as to be rotatable in a predetermined direction.

21. The portable information terminal device having a camera feature according to claim 15, wherein
said case and said lid member are linked to each other by way of a sliding engaging section so as to be able to slide in a predetermined direction.

22. The portable information terminal device having a camera feature according to claim 15, further comprising:
a control section which detects one of a substantial agreement of the optical axis of said first optical system and that of said second optical system and a motion of causing the optical axis of said first optical system and that of said second optical system to substantially agree with each other and selects a second imaging mode suited for an operation of picking up an image of an object point at a near point in the field of view, using the synthetic optical system, and different from a first imaging mode suited for an operation of picking up an image of an object point at a far point in the field of view, using only said first optical system.

23. The portable information terminal device having a camera feature according to claim 22, wherein
the second imaging mode includes a positional information detection mode for obtaining information on a current relative position of itself by detecting the direction and distance of relative movement of itself from the images of the object picked up at different moments.

24. The portable information terminal device having a camera feature according to claim 23, further comprising:
an external interface which outputs the information on the relative position of itself as obtained in the positional information detection mode to an external device.

25. The portable information terminal device having a camera feature according to claim 22, wherein
the second imaging mode includes a code reading mode for picking up an image of an optically readable code recorded on a recording medium and representing data and for reproducing the data.

26. A portable information terminal device having a camera feature and comprising:
a case provided with a first optical system and an image pickup element which receives light from an object point focused by said first optical system and outputs a corresponding image signal; and
a lid member of the device provided at a predetermined position with a second optical system different from said first optical system, wherein
said lid member is linked to said case so as to make itself displaceable relative to said case and able to take a first state of an optical axis of said first optical system substantially agreeing with that of said second optical system and a second state of said second optical system of being reversed and of the optical axis of said first optical system substantially agreeing with that of said second optical system; and
optical parameters of a synthetic optical system obtained by combining said first optical system and said second optical system in the first state of displacing said case and said lid member relative to each other,
optical parameters of a synthetic optical system obtained by combing said first optical system and said second optical system in the second state of displacing said case and said lid member relative to each other and
optical parameters of said first optical system are differentiated from each other.

27. The portable information terminal device having a camera feature according to claim 26, wherein
the optical parameters include a parameter relating to the position of the focused object point.

28. The portable information terminal device having a camera feature according to claim 26, wherein
the optical parameters include at least one of magnification and view angle.

29. The portable information terminal device having a camera feature according to claim 26, further comprising:
a control section which detects either a substantial agreement of the optical axis of said first optical system and that of said second optical system and a reversed/unreversed condition of said second optical system or a motion of causing the optical axis of said first optical system and that of said second optical system to substantially agree with each other and also reversing/unreversing said second optical system and selects either a second imaging mode suited for an image pickup operation using a synthetic optical system formed by said first optical system and said second optical system and different from a first imaging mode suited for an image pickup operation using only said first optical system or a third imaging mode suited for an image pickup operation using a synthetic optical system formed by said first optical system and said second optical system, which is reversed, and different from the first imaging mode.

30. The portable information terminal device having a camera feature according to claim 29, wherein
the first imaging mode is suited to pick up an image of an object point at a far point in the field of view of the camera and at least one of the second imaging mode and the third imaging mode is suited to pick up an image of an object point at a near point in the field of view.

31. The portable information terminal device having a camera feature according to claim 30, wherein the imaging mode suited for picking up an image of an object point at a near point in the field of view includes a positional information detection mode for obtaining information on a current relative position of itself by detecting direction and distance of relative movement of itself from the images of the object picked up at different moments.

32. The portable information terminal device having a camera feature according to claim 31, further comprising:
an external interface which outputs the information on the relative position of itself as obtained in the positional information detection mode to an external device.

33. The portable information terminal device having a camera feature according to claim 30, wherein
the imaging mode suited for picking up an image of an object point at a near point in the field of view includes a code reading mode for picking up an image of an optically readable code recorded on a recording medium and representing data and for reproducing the data.

34. The portable information terminal device having a camera feature according to claim 30, wherein
a lighting section is provided at said lid member for lighting an object point at a near point in the field of view in said imaging mode.

35. The portable information terminal device having a camera feature according to claim 34, wherein
a display section which displays information is further provided at least one of at said case and at said lid member; and
said lighting section includes a light-conducting member which conducts light used in said display section to the object at a near point in the field of view.

36. A portable information terminal device having a camera feature and comprising:
a case provided with a first optical system and an image pickup element which receives light from an object point focused by the first optical system and outputs a corresponding image signal; and
a lid member of the device provided at predetermined respective positions with a second optical system different from said first optical system and a third optical system different from said first optical system and said second optical system, wherein
said lid member are linked to said case so as to make itself displaceable relative to said case and able to take a first state of an optical axis of said first optical system substantially agreeing with that of said second optical system and a second state of the optical axis of said first optical system substantially agreeing with that of said third optical system; and
optical parameters of a synthetic optical system obtained by combining said first optical system and said second optical system in the first state of displacing said case and said lid member relative to each other,
optical parameters of a synthetic optical system obtained by combing said first optical system and said third optical system in the second state of displacing said case and said lid member relative to each other and
optical parameters of said first optical system are differentiated from each other.

37. The portable information terminal device having a camera feature according to claim 36, wherein
the optical parameters include a parameter relating to the position of the focused object point.

38. The portable information terminal device having a camera feature according to claim 36, wherein
the optical parameters include at least one of magnification and view angle.

39. The portable information terminal device having a camera feature according to claim 36, further comprising:
a control section which detects one of either a substantial agreement of the optical axis of said first optical system and that of said second optical system or a substantial agreement of the optical axis of said first optical system and that of said third optical system and either a motion of causing the optical axis of said first optical system and that of said second optical system to substantially agree with each other or a motion of causing the optical axis of said first optical system and that of said third optical system to substantially agree with each other and selects either a second imaging mode suited for an image pickup operation using a synthetic optical system formed by said first optical system and said second optical system and different from a first imaging mode suited for an image pickup operation using only said first optical system or a third imaging mode suited for an image pickup operation using a synthetic optical system formed by said first optical system and said third optical system and different from the first imaging mode.

40. The portable information terminal device having a camera feature according to claim 39, wherein
the first imaging mode is suited to pick up an image of an object point at a far point in the field of view of the camera and at least one of the second imaging mode and the third imaging mode is suited to pick up an image of an object point at a near point in the field of view.

41. The portable information terminal device having a camera feature according to claim 40, wherein
the imaging mode suited for picking up an image of an object point at a near point in the field of view includes a positional information detection mode for obtaining information on a current relative position of itself by detecting direction and distance of relative movement of itself from the images of the object picked up at different moments.

42. The portable information terminal device having a camera feature according to claim 41, further comprising:
an external interface which outputs the information on the relative position of itself as obtained in the positional information detection mode to an external device.

43. The portable information terminal device having a camera feature according to claim 40, wherein
the imaging mode suited for picking up an image of an object point at a near point in the field of view includes a code reading mode for picking up an image of an optically readable code recorded on a recording medium and representing data and for reproducing the data.

44. The portable information terminal device having a camera feature according to claim 40, wherein
a lighting section is provided at said lid member for lighting an object point at a near point in the field of view in said imaging mode.

45. The portable information terminal device having a camera feature according to claim 44, wherein
a display section which displays information is further provided at least one of at said case and at said lid member; and
said lighting section includes a light-conducting member which conducts light used in said display section to the object at a near point in the field of view.

* * * * *